(12) United States Patent
Lee et al.

(10) Patent No.: US 12,234,173 B2
(45) Date of Patent: Feb. 25, 2025

(54) ELECTRONIC DEVICE INCLUDING BACK SURFACE PLATE AND MANUFACTURING METHOD OF BACK SURFACE PLATE

(71) Applicant: Samsung Electronics Co., Ltd., Gyeonggi-do (KR)

(72) Inventors: Hosoon Lee, Gyeonggi-do (KR); Wonsun Lee, Gyeonggi-do (KR); Hyunsuk Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 17/725,714

(22) Filed: Apr. 21, 2022

(65) Prior Publication Data

US 2022/0396515 A1 Dec. 15, 2022

Related U.S. Application Data

(63) Continuation of application No. PCT/KR2022/005108, filed on Apr. 8, 2022.

(30) Foreign Application Priority Data

Jun. 14, 2021 (KR) .................. 10-2021-0076698

(51) Int. Cl.
*G06F 1/16* (2006.01)
*C03B 11/00* (2006.01)
*C03B 23/20* (2006.01)

(52) U.S. Cl.
CPC .............. *C03B 11/00* (2013.01); *C03B 23/20* (2013.01); *G06F 1/1633* (2013.01); *C03B 2215/406* (2013.01); *C03B 2215/41* (2013.01)

(58) Field of Classification Search
None
See application file for complete search history.

(56) References Cited

U.S. PATENT DOCUMENTS

| | | |
|---|---|---|
| 5,370,990 A | 12/1994 | Staniford et al. |
| 8,824,140 B2 * | 9/2014 | Prest .................. G06F 1/1643 361/755 |
| 9,232,670 B2 * | 1/2016 | Pakula .................. G02B 7/02 |
| 10,870,261 B2 * | 12/2020 | Zhang .................. C03B 9/03 |
| 11,864,304 B2 * | 1/2024 | Wilson .................. C03C 27/10 |

(Continued)

FOREIGN PATENT DOCUMENTS

| | | |
|---|---|---|
| CN | 110856385 A | 2/2020 |
| JP | 10-142590 A | 5/1998 |

(Continued)

OTHER PUBLICATIONS

International Search Report dated Jul. 22, 2022.

*Primary Examiner* — Courtney L Smith
(74) *Attorney, Agent, or Firm* — Cha & Reiter, LLC

(57) ABSTRACT

According to various embodiments, a back surface plate configured to form a back surface of an electronic device may include: a first glass part including a first pattern area including a pattern having a predetermined shape on a first surface; and a second glass part, at least a portion of which is disposed on the first surface of the first glass part, the second glass part including a first shape complimentary to the first pattern area, wherein the second glass part may have a color different from the color of the first glass part.

19 Claims, 17 Drawing Sheets

(56) References Cited

U.S. PATENT DOCUMENTS

| | | | |
|---|---|---|---|
| 2011/0019354 A1* | 1/2011 | Prest .................... | C03C 21/002 |
| | | | 361/679.21 |
| 2013/0083506 A1* | 4/2013 | Wright .............. | B32B 17/10018 |
| | | | 156/332 |
| 2014/0076731 A1 | 3/2014 | Russell-Clarke et al. | |
| 2014/0178647 A1 | 6/2014 | Kim et al. | |
| 2015/0190986 A1* | 7/2015 | Bibl ......................... | B32B 7/04 |
| | | | 428/138 |
| 2017/0146710 A1* | 5/2017 | Jin ........................ | G02B 3/0006 |
| 2018/0217639 A1 | 8/2018 | Jones et al. | |
| 2020/0045155 A1 | 2/2020 | Ha et al. | |
| 2020/0150726 A1* | 5/2020 | Jones ..................... | G09F 9/301 |
| 2020/0344878 A1 | 10/2020 | Wilson et al. | |
| 2022/0167517 A1 | 5/2022 | Moon et al. | |
| 2022/0248552 A1 | 8/2022 | Li | |

FOREIGN PATENT DOCUMENTS

| | | |
|---|---|---|
| JP | 11-127895 A | 5/1999 |
| JP | 2010-137456 A | 6/2010 |
| KR | 1999-0085119 A | 12/1999 |
| KR | 10-2014-0082432 A | 7/2014 |
| KR | 10-1553606 B1 | 9/2015 |
| KR | 10-2017-0131128 A | 11/2017 |
| KR | 10-2018-0007634 A | 1/2018 |
| KR | 10-2020-0015046 A | 2/2020 |
| KR | 10-2020-0112228 A | 10/2020 |
| KR | 10-2021-0002898 A | 1/2021 |

\* cited by examiner

ELECTRONIC DEVICE INCLUDING BACK SURFACE PLATE AND MANUFACTURING METHOD OF BACK SURFACE PLATE

CROSS-REFERENCE TO RELATED APPLICATION(S)

This application is a continuation application, claiming priority under § 365(c), of an International application No. PCT/KR2022/005108, filed on Apr. 8, 2022, which is based on and claims the benefit of a Korean patent application number 10-2021-0076698, filed on Jun. 14, 2021, in the Korean Intellectual Property Office, the disclosure of which is incorporated by reference herein in its entirety.

BACKGROUND

1. Field

Various embodiments of the disclosure relate to an electronic device including a back surface plate and a method of manufacturing the back surface plate.

2. Description of Related Art

An electronic device refers to a device that performs a specific function according to a program equipped therein, such as an electronic scheduler, a portable multimedia player, a mobile communication terminal, a tablet PC, an image/sound device, a desktop/laptop PC, or a vehicle navigation system, as well as a home appliance. The above-mentioned electronic devices may output, for example, information stored therein as sound or an image. As the degree of integration of electronic devices has increased and ultra-high-speed and large-capacity wireless communication has become popular, multiple functions have recently come to be provided in a single electronic device, such as a mobile communication terminal. For example, various functions, such as an entertainment function (e.g., a game function), a multimedia function (e.g., a music/video reproduction function), a communication and security function for mobile banking or the like, a schedule management function, and an e-wallet function, are integrated in a single electronic device, in addition to a communication function.

Recently, as miniaturization, thickness reduction, and portability of electronic devices such as smartphones and/or notebook computers are emphasized, attempts are being made to adopt glass material components beautiful in design and apply the components to exterior materials of electronic devices. In addition, various surface treatment techniques are being developed to impart functional effects to the exterior materials of glass material components in addition to design effects.

As the portability of electronic devices such as smartphones or notebook computers is emphasized, high strength is required for an exterior material, and a design demand for expressing an aesthetic feeling through various patterns is increasing.

However, in general, in order to express patterns and colors on a glass cover, a method of stacking a colored film on a glass cover is used.

A back surface plate and an electronic device including the same according to various embodiments of the disclosure are capable of providing a cover that is capable of meeting a high design demand by expressing colors and patterns by the glass cover itself.

SUMMARY

According to various embodiments, a back surface plate configured to form a back surface of an electronic device may include: a first glass part including a first pattern area including a pattern having a predetermined shape on a first surface; and a second glass part, at least a portion of which is disposed on the first surface of the first glass part, the second glass part including a first shape complimentary to the first pattern area, wherein the second glass part may have a color different from the color of the first glass part.

According to various embodiments, a method of manufacturing a back surface plate may include: a process of shaping a first glass part including a first pattern area including a pattern of a predetermined shape on a first surface, the glass part having a first color; a process of seating a second glass part on the first surface of the glass part, the second glass part having a second color, the second color being different from the first color; a process of placing the first glass part with the second glass part being seated on the first surface of the first glass part, into an area of a lower core structure of a mold structure such that the second surface opposite to the first surface of the first glass part faces the lower core structure of the mold structure; a process of preheating the second glass part at a high temperature, and lowering an upper core structure of the mold structure toward the lower core structure; a process of causing the second glass part to be penetrated into the first pattern area by pressing the second glass part by the upper core structure; and a process of cooling the first glass part and the second glass part.

According to various embodiments, an electronic device may include: a housing including a front surface plate facing a first direction and a back surface plate facing a second direction opposite to the front surface plate, at least a portion of the front surface plate including a transparent area; a battery disposed inside the housing; and a display disposed in the housing and including a screen area exposed through the front surface plate, wherein the back surface plate may include: a first glass part including a first pattern area including a pattern having a predetermined shape on a first surface facing the second direction; and a second glass part disposed on the first glass part in the second direction, and including a first shape complimentary to the first pattern area, wherein the second glass part may have a color different from that of the first glass part.

According to various embodiments of the disclosure, it is possible to provide an exterior material having a beautiful design for an electronic device.

By providing an electronic device including a real plate and a method of manufacturing the same according to various embodiments, it is possible to express a color and a pattern on a glass cover itself. Accordingly, it is possible to provide a cover improved in design.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
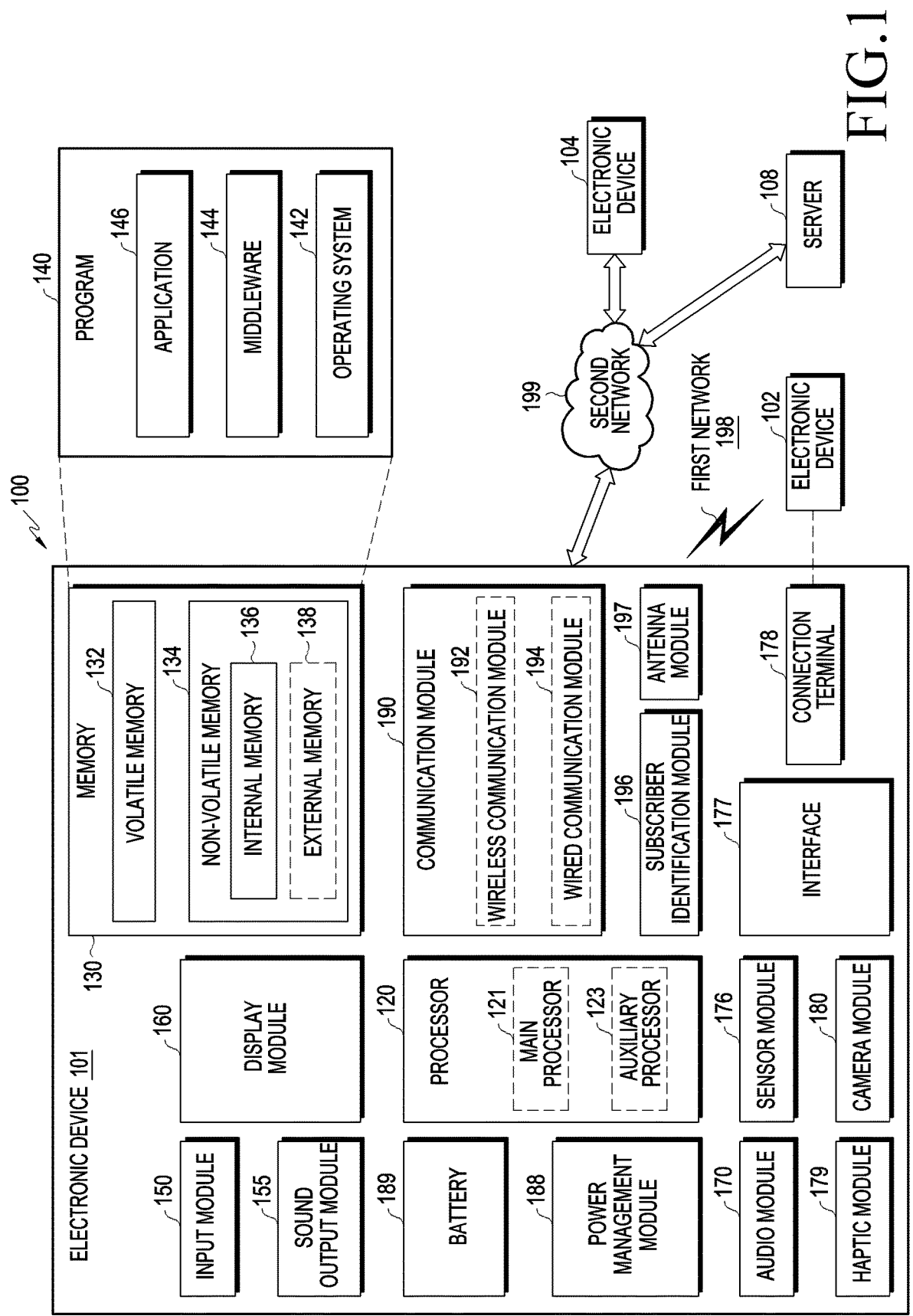
FIG. 1 is a block diagram of an electronic device according to various embodiments in a network environment.

FIG. 1 is a block diagram illustrating an electronic device in a network environment according to various embodiments.

Referring to FIG. 1, a network environment includes an electronic device 101 that may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module (SIM) 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing 1eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
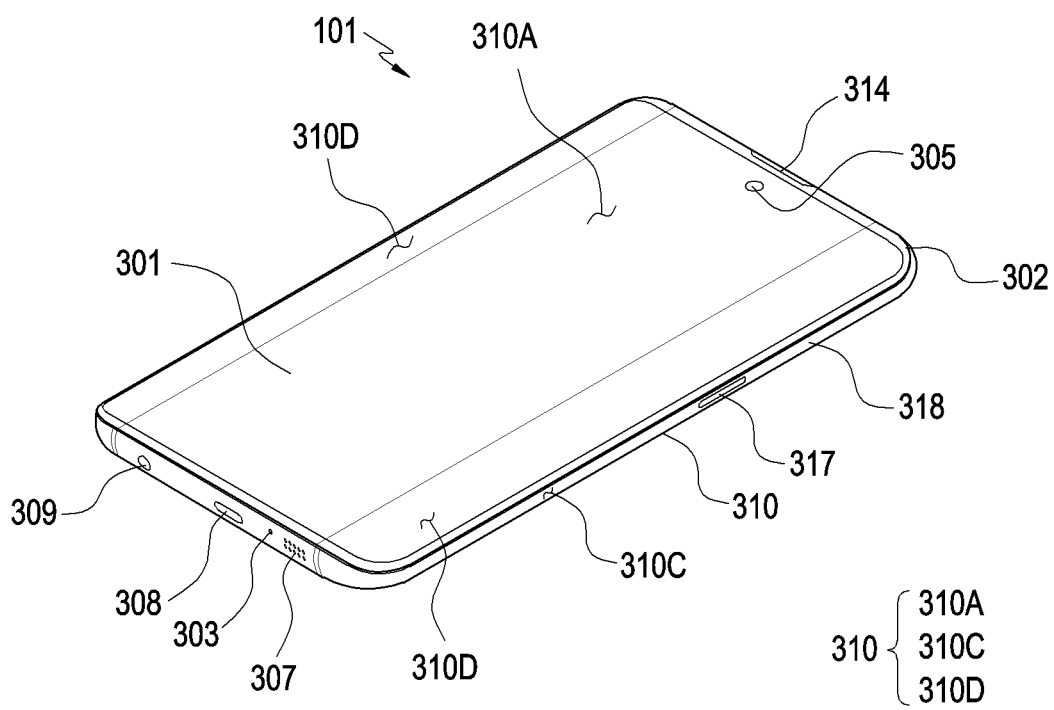
FIG. 2 is a front perspective view of an electronic device according to various embodiments.
Figure 3:
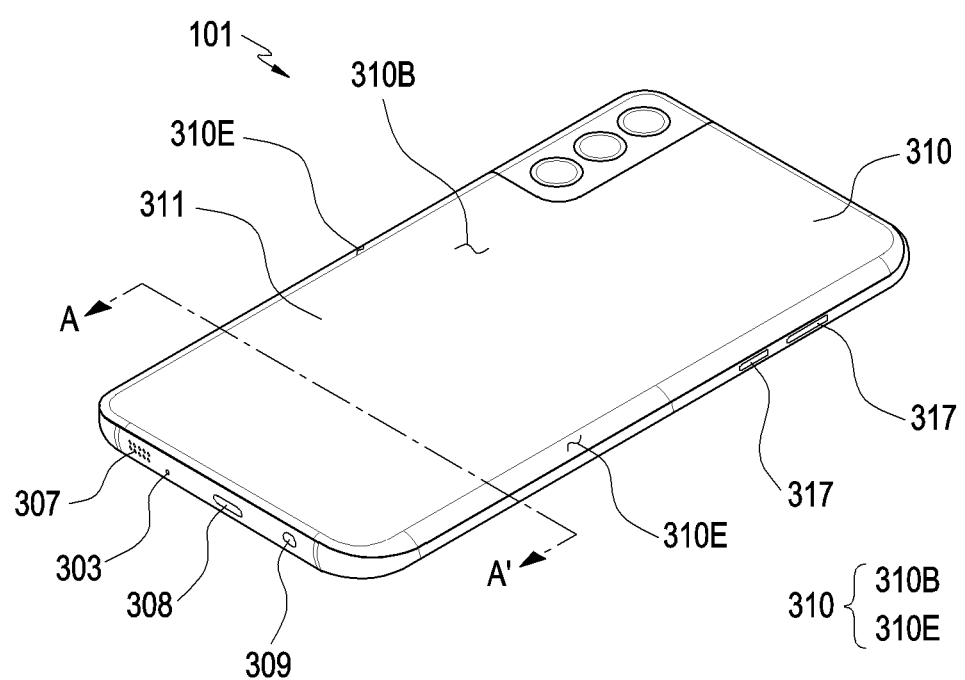
FIG. 3 is a rear perspective view of the electronic device according to various embodiments.

FIG. 2 is a front perspective view of an electronic device according to various embodiments. FIG. 3 is a rear perspective view of the electronic device according to various embodiments.

Referring to FIGS. 2 and 3, an electronic device 101 according to an embodiment may include a housing 310 including a front surface 310A, a back surface 310B, and a side surface 310C surrounding a space between the front surface 310A and the back surface 310B. In another embodiment (not illustrated), the housing 310 may refer to a structure that defines a part of the front surface 310A and the side surface 310C in FIG. 2, and the back surface 310B in FIG. 3. According to an embodiment, at least a portion of the front surface 310A may be provided by a substantially transparent front surface plate 302 (e.g., a glass plate or a polymer plate including various coating layers). The back surface 310B may be defined by the back surface plate 311. The back surface plate 311 may be formed of, for example, glass, ceramic, a polymer, a metal (e.g., aluminum, stainless steel (STS), or magnesium), or a combination of two or more of these materials. The side surface 310C may be defined by a side bezel structure (or a "side member") 318 coupled to the front surface plate 302 and the back surface plate 311, and including a metal and/or a polymer. In some embodiments, the back surface plate 311 and the side bezel structure 318 may be integrally configured with each other, and may include the same material (e.g., glass, a metal material such as aluminum, or ceramic).

In the illustrated embodiment, the front surface plate 302 may include, at the opposite ends of long edges thereof, two first edge areas 310D, which are bent from the front surface 310A toward the back surface plate 311 and extend seamlessly. In the illustrated embodiment (see FIG. 3), the back surface plate 311 may include, at the opposite ends of long edges thereof, two second edge areas 310E, which are bent from the back surface 310B toward the front surface plate 302 and extend seamlessly. In some embodiments, the front surface plate 302 (or the back surface plate 311) may include only one of the first edge areas 310D (FIG. 2) (or the second edge areas 310E (FIG. 3)). In another embodiment, some of the first edge areas 310D or the second edge areas 310E may not be included. In the embodiments described above, when viewed from a side of the electronic device 101, the side bezel structure 318 may have a first thickness (or width) on the side surface portions that do not include the first edge areas 310D or the second edge areas 310E described above, and may have a second thickness, which is smaller than the first thickness, on the side surface portions that include the first edge areas 310D or the second edge areas 310E.

According to an embodiment, the electronic device 101 may include at least one of a display device 301, an audio module 303, 307, or 314 (e.g., the audio module 170 in FIG. 1), a sensor module (e.g., the sensor module 176 in FIG. 1), a camera module 305 or 312 (e.g., the camera module 180 in FIG. 1), a key input device 317 (e.g., the input module 150 in FIG. 1), and a first connector hole 308 and/or a second connector hole 309 (e.g., the connection terminal 178 in FIG. 1). In some embodiments, in the electronic device 101, at least one of the components (e.g., the second connector hole 309) may be omitted, or other components may be additionally included.

According to one embodiment, the display device 301 may be visually exposed through, for example, a substantial portion of the front surface plate 302. In some embodiments, at least a portion of the display device 301 may be exposed through the front surface plate 302 defining the front surface 310A and the first edge areas 310D. In some embodiments, the edges of the display device 301 may be configured to be substantially the same as the shape of the periphery of the front surface plate 302 adjacent thereto. In another embodiment (not illustrated), the distance between the periphery of the display device 301 and the periphery of the front surface plate 302 may be substantially constant in order to enlarge the exposed area of the display device 301.

According to an embodiment, the surface (or the front surface plate 302) of the housing 310 may include a screen display area provided since the display device 301 is visually exposed. For example, the screen display area may include the front surface 310A and the first edge areas 310D.

In another embodiment (not illustrated), a portion of the screen display area (e.g., the front surface 310A and the first edge areas 310D) of the display device 301 may be provided with a recess or an opening and may include at least one of an audio module 314, a sensor module (not illustrated), a light-emitting element (not illustrated), and a camera module 305, which are aligned with the recess or the opening. In another embodiment (not illustrated), the back surface of the screen display area of the display device 301 may include at least one of an audio module 314, a sensor module (not illustrated), a camera module 305, a fingerprint sensor (not illustrated), and a light-emitting element (not illustrated). In another embodiment (not illustrated), the display device 301 may be coupled to or disposed adjacent to a touch-sensitive circuit, a pressure sensor capable of measuring a touch intensity (pressure), and/or a digitizer configured to detect a magnetic field-type stylus pen. In some embodiments, at least some of the key input devices 317 may be disposed in the first edge areas 310D and/or the second edge areas 310E.

According to various embodiments, the first camera module 305 of the camera modules 305 and 312 and/or the sensor module may be arranged in the internal space of the electronic device to be in contact with the external environment through the transparent area of the display device 301. According to an embodiment, the area of the display device 301 that faces the first camera module 305 may be configured as a transmission area having a predetermined transmittance as a portion of a content display area. According to an embodiment, the transmission area may have a transmittance in the range of about 5% to about 20%. The transmission area may include an area overlapping the effective area (e.g., the view angle area) of the first camera module 305 through which light imaged by an image sensor to generate an image passes. For example, the transmission region of the display device 301 may include an area having a lower pixel density and/or a lower wiring density than the surrounding region. For example, the transmission area may replace a recess or opening.

According to an embodiment, the audio module 303, 307, or 314 may include a microphone hole 303 and a speaker hole 307 or 314. The microphone hole 303 may include a microphone disposed therein to acquire external sound, and in some embodiments, a plurality of microphones may be disposed therein to be able to detect the direction of sound. The speaker hole 307 or 314 may include an external speaker hole 307 and a call receiver hole 314. In some embodiments, the speaker hole 307 or 314 and the microphone hole 303 may be implemented as a single hole, or a speaker may be included without the speaker hole 307 or 314 (e.g., a piezo speaker). The audio module 303, 307, or 314 is not limited to the above-described structure, and may be variously changed in design depending on the structure of the electronic device 101, for example, by mounting only some audio modules or by adding new audio modules.

According to an embodiment, sensor modules (not illustrated) may generate an electrical signal or a data value corresponding to, for example, an internal operating state of the electronic device 101 or an external environmental state. The sensor modules (not illustrated) may include, for example, a first sensor module (e.g., a proximity sensor) and/or a second sensor module (e.g., a fingerprint sensor) disposed on the front surface 310A of the housing 310, and/or a third sensor module (e.g., an HRM sensor) and/or a fourth sensor module (e.g., a fingerprint sensor) disposed on the back surface 310B of the housing 310. In some embodiments (not illustrated), the fingerprint sensor may be disposed not only on the front surface 310A (e.g., the display device 301) of the housing 310, but also on the back surface 310B. The electronic device 101 may further include at least one of a sensor module (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor. The sensor modules are not limited to the above-described structure, and may be variously changed in design depending on the structure of the electronic device 101, for example, by mounting only some of the sensor modules or by adding new sensor modules.

According to an embodiment, the camera modules 305 and 312 may include, for example, a first camera module 305 disposed on the front surface 310A of the electronic device 101, a second camera module 312 disposed on the back surface 310B, and/or a flash (not illustrated). The camera modules 305 and 312 may include one or more lenses, an image sensor, and/or an image signal processor. The flash (not illustrated) may include, for example, a light-emitting diode or a xenon lamp. In some embodiments, two or more lenses (e.g., an infrared camera, a wide-angle lens, and a telephoto lens), and image sensors may be disposed on one surface of the electronic device 101. The camera modules 305 and 312 are not limited to the above-described structure, and may be variously changed in design depending on the structure of the electronic device 101, for example, by mounting only some of the camera modules or by adding new camera modules.

According to an embodiment, the electronic device 101 may include a plurality of camera modules (e.g., a dual camera or a triple camera) having different properties (e.g., angles of view) or functions, respectively. For example, a plurality of camera modules 305 and 312 including lenses having different angles of view may be configured, and the electronic device 101 may control the change of the angles of view of the camera modules 305 and 312 executed therein based on a user's selection. For example, at least one of the camera modules 305 and 312 may be a wide-angle camera, and at least one of other camera modules may be a telephoto camera. Similarly, at least one of the camera modules 305 and 312 may be a front camera, and at least one of other camera modules may be a rear camera. In addition, the camera modules 305 and 312 may include at least one of a wide-angle camera, a telephoto camera, or an infrared (IR) camera (e.g., a time-of-flight (TOF) camera, or a structured light camera). According to an embodiment, the IR camera may be operated as at least a part of a sensor module. For example, the TOF camera may be operated as at least a part of a sensor module (not illustrated) for detecting a distance to a subject.

According to an embodiment, the key input devices 317 may be disposed on the side surface 310C of the housing 310. In another embodiment, the electronic device 101 may not include some or all of the above-mentioned key input devices 317, and a key input device 317, which is not included in the above-mentioned key input devices, may be implemented in another type, such as a soft key, on the display device 301.

According to an embodiment, the light-emitting element (not illustrated) may be disposed on, for example, the front surface 310A of the housing 310. The light-emitting element (not illustrated) may provide, for example, information about the state of the electronic device 101 in an optical form. In another embodiment, the light-emitting element (not illustrated) may provide a light source that is interlocked with, for example, the operation of the first camera module 305. The light-emitting element (not illustrated) may include, for example, an LED, an IR LED, and/or a xenon lamp.

According to an embodiment, the connector holes 308 and 309 may include, for example, a first connector hole 308 capable of accommodating a connector (e.g., a USB connector) for transmitting/receiving power and/or data to/from an external electronic device and/or a second connector hole 309 capable of accommodating a connector (e.g., an earphone jack) for transmitting/receiving an audio signal to/from an external electronic device.

According to an embodiment, a first camera module 305 of the camera modules 305 and 312 and/or some (not illustrated) of the sensor modules may be disposed to be exposed to the outside through at least a portion of the display device 301. For example, the camera modules 305 may include a punch hole camera disposed inside a hole or recess provided in the back surface of the display device 301. According to an embodiment, the second camera modules 312 may be disposed inside the housing 310 such that the lens is exposed to the back surface 310B of the electronic device 101. For example, the second camera modules 312 may be disposed on a printed circuit board (e.g., the printed circuit board 340 in FIG. 4).

According to an embodiment, the first camera modules 305 and/or the sensor modules may be disposed from the internal space of the electronic device 101 to the front surface plate 302 of the display device 301 to come into contact with the external environment through a transparent area. In addition, some sensor modules 304 may be disposed in the internal space in the electronic device so as to implement the functions thereof without being visually exposed through the front surface plate 302.

Figure 4:
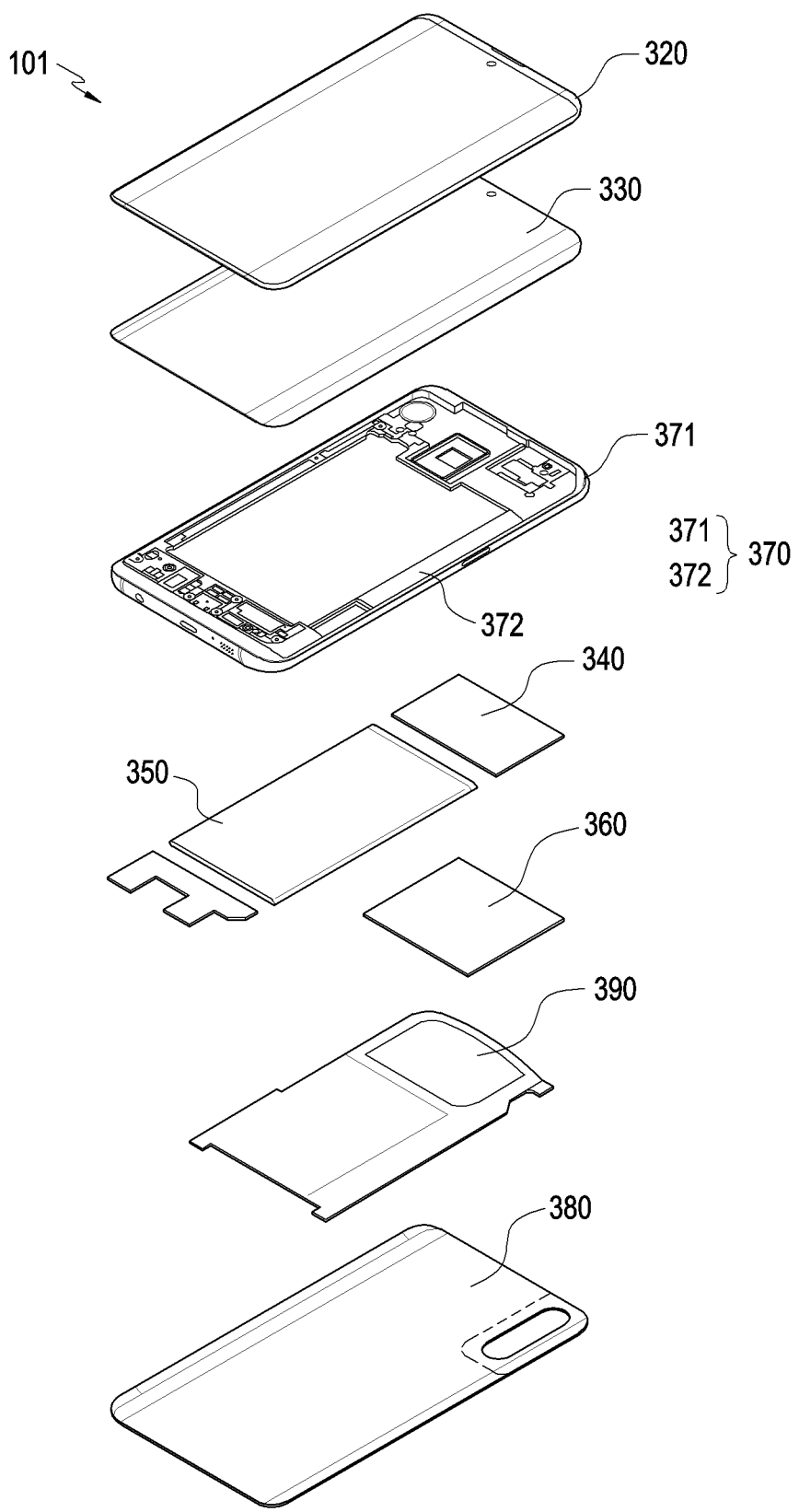
FIG. 4 is an exploded perspective view of the electronic device according to various embodiments.

FIG. 4 is an exploded perspective view of the electronic device according to various embodiments.

Referring to FIG. 4, the electronic device 101 (e.g., the electronic device 101 in FIGS. 1 to 3) according to various embodiments may include a support bracket 370, a front surface plate 320 (e.g., the front surface plate 302 in FIG. 2), a display 330 (e.g., the display device 301 in FIG. 2), a printed circuit board 340 (e.g., a PCB, flexible PCB (FPCB), or a rigid flexible PCB (RFPCB)), a battery 350 (e.g., the battery 189 in FIG. 1), a second support member 360 (e.g., the rear case), an antenna 390 (e.g., the antenna module 197 in FIG. 1), and a back surface plate 380 (e.g., the back surface plate 311 in FIG. 3). The support bracket 370 of the electronic device 101 according to an embodiment may include a side bezel structure 371 (e.g., the side bezel structure 318 in FIG. 2) and a first support member 372.

In some embodiments, at least one of the components (e.g., the first support member 372 or the second support member 360) may be omitted from the electronic device 101, or other components may be additionally included in the electronic device 101. At least one of the components of the electronic device 101 may be the same as or similar to at least one of the components of the electronic device 101 in FIG. 2 or FIG. 3, and a redundant description thereof will be omitted below.

According to various embodiments, the first support member 372 may be disposed inside the electronic device 101, and the first support member 372 may be connected to the side bezel structure 371, or may be integrated with the side bezel structure 371. The first support member 372 may be made of, for example, a metal material and/or a non-metal material (e.g., a polymer). The display 330 may be coupled to one surface of the first support member 372, and the printed circuit board 340 may be coupled to the other surface of the first support member 372.

According to various embodiments, on the printed circuit board 340, a processor, a memory, and/or an interface may be mounted. The processor may include one or more of, for example, a central processing unit, an application processor, a graphics processor, an image signal processor, a sensor hub processor, or a communication processor. According to various embodiments, the printed circuit board 340 may include a flexible printed circuit board type radio frequency cable (FRC). For example, the printed circuit board 340 may be disposed on at least a portion of the first support member 372, and may be electrically connected to an antenna module (e.g., the antenna module 197 in FIG. 1) and a communication module (e.g., the communication module 190 in FIG. 1).

According to an embodiment, the memory may include, for example, a volatile memory or a nonvolatile memory.

According to an embodiment, the interface may include, for example, a high-definition multimedia interface (HDMI), a universal serial bus (USB) interface, an SD card interface, and/or an audio interface. The interface may electrically or physically connect, for example, the electronic device 101 to an external electronic device and may include a USB connector, an SD card/an MMC connector, or an audio connector.

According to various embodiments, the battery 350 is a device for supplying power to at least one component of the electronic device 101 and may include, for example, a non-rechargeable primary battery, a rechargeable secondary battery, or a fuel cell. At least a portion of the battery 350 may be disposed on substantially the same plane as, for example, the printed circuit board 340. The battery 350 may be integrally disposed inside the electronic device 101, or may be detachably disposed on the electronic device 101.

According to various embodiments, the second support member 360 (e.g., the rear case) may be disposed between the printed circuit board 340 and the antenna 390. For example, the second support member 360 may include one surface to which at least one of the printed circuit board 340 and the battery 350 is coupled, and the other surface to which the antenna 390 is coupled.

According to various embodiments, the antenna 390 may be disposed between the back surface plate 380 and the battery 350. The antenna 390 may include, for example, a near field communication (NFC) antenna, a wireless charging antenna, and/or a magnetic secure transmission (MST) antenna. The antenna 390 may perform short-range communication with, for example, an external electronic device, or may transmit/receive power required for charging to/from the external device in a wireless manner. In another embodiment, an antenna structure may be implemented by a part of the side bezel structure 371, a part of the first support member 372, or a combination thereof.

According to various embodiments, the back surface plate 380 may define at least a portion of the back surface (e.g., the back surface 310B in FIG. 3) of the electronic device 101.

Figure 5:
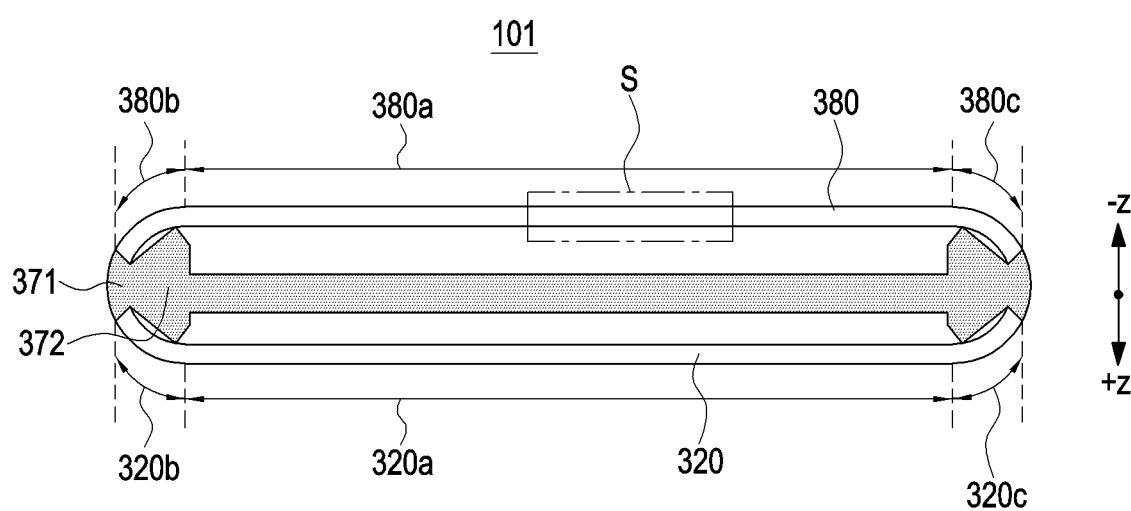
FIG. 5 is a cross-sectional view of the electronic device according to various embodiments of the disclosure taken along line A-A' in FIG. 3.

FIG. 5 is a cross-sectional view of the electronic device according to various embodiments of the disclosure taken along line A-A' in FIG. 3.

Referring to FIG. 5, an electronic device (e.g., the electronic device 101 in FIGS. 1 to 4) may include a housing 310 configured to mount therein electronic components, and the housing 310 may include a front surface plate 320 (e.g., the front surface plate 302 in FIG. 2), a back surface plate 380 (e.g., the back surface plate 311 in FIG. 3), a side bezel structure 371 (e.g., the side bezel structure 318 in FIG. 2), and a first support member 372. The side bezel structure 371 and the first support member 372 may be integrated with each other. Some or all of the front surface plate 320, the back surface plate 380, the side bezel structure 371, and the first support member 372 of FIG. 5 may be the same as the front surface plate 320, the back surface plate 380, and the side bezel structure 371, and the first support member 372 of FIG. 4.

According to various embodiments, the first support member 372 may provide a space for accommodating a plurality of electronic components, and the side bezel structure 371 may surround at least a portion of the first support member 372 to cover the side surface of the electronic device 101. The first support member 372 and the side bezel structure 371 may be connected, on the front surfaces thereof, to the display (e.g., the display 330 in FIG. 4) to the front surface plate 320 so as to cover the internal space in which the plurality of electronic components are accommodated, and may be connected, on the back surfaces thereof, to the back surface plate 380.

According to various embodiments, the front surface plate 320 and/or the back surface plate 380 may include flat portions and curved portions. For example, the front surface plate 320 may include a $(1-1)^{th}$ curved portion 320b and a $(1-2)^{th}$ curved portion 320c extending from opposite ends of a first flat portion 320a disposed in the center thereof. The $(1-1)^{th}$ curved portion 320b and the $(1-2)^{th}$ curved portion 320c may be implemented in shapes corresponding to each other, and may extend seamlessly toward the back surface plate 380. As another example, the back surface plate 380 may include a $(2-1)^{th}$ curved portion 380b and a $(2-2)^{th}$ curved portion 380c extending from opposite ends of a second flat portion 380a disposed in the center thereof. The $(2-1)^{th}$ curved portion 380b and the $(2-2)^{th}$ curved portion 380c may be implemented in shapes corresponding to each other, and may extend seamlessly toward the front surface plate 320.

Figure 6A:
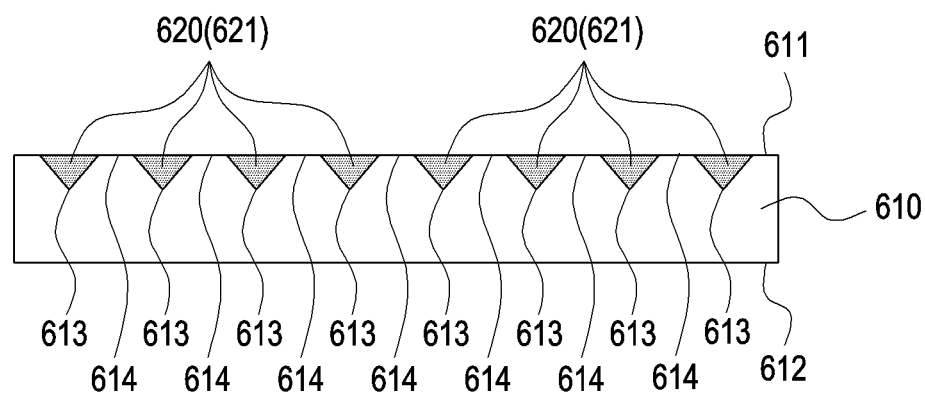
FIGS. 6A and 6B are enlarged cross-sectional views of the area S of FIG. 5, according to various embodiments of the disclosure.
Figure 6B:
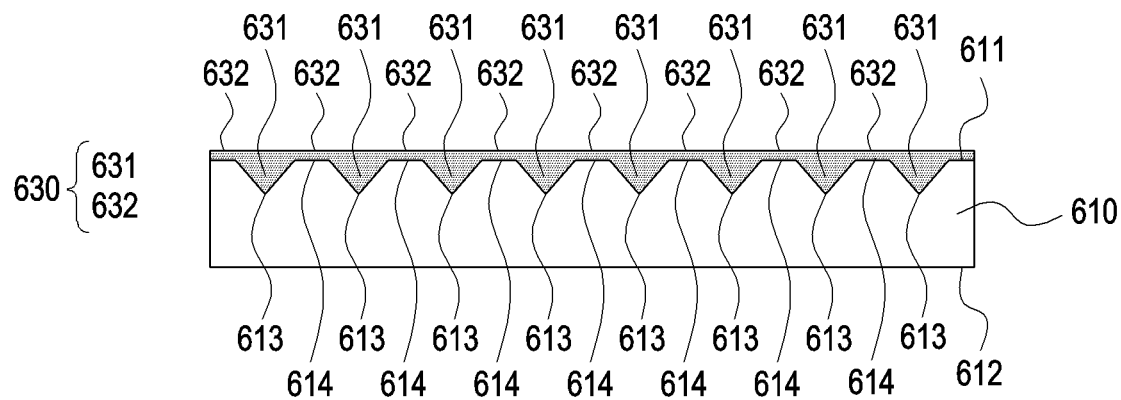

FIGS. 6A and 6B are enlarged cross-sectional views of the area S of FIG. 5, according to various embodiments.

FIGS. 6A and 6B are views for describing the back surface plate 380 of the electronic device 101 according to various embodiments. According to various embodiments, a plurality of layers may be disposed in the back surface plate 380 by being stacked. FIGS. 6A and 6B are views for describing a first glass plate 610 and a second glass part 620 or 630 among the plurality of layers of the back surface plate 380. The back surface plate 380 may include remaining layers other than the first glass plate 610 and the second glass part 620 or 630, and FIGS. 6A and 6B do not illustrate the remaining layers, but only illustrate the first glass plate 610 and the second glass part 620 or 630, which will be described below. FIGS. 6A and 6B are views for describing various embodiments of the second glass part 620 or 630. The description made with respect to FIG. 6A may be applicable to the description made with reference to FIG. 6B. In the description made with reference to FIG. 6B, a description overlapping with the description made with reference to FIG. 6A will be omitted. The description made with reference to FIGS. 6A and 6B may be applicable to the description made with reference to the drawings to be described later. In the description made with reference to the drawings to be described later, a description overlapping the description made with reference to FIGS. 6A and 6B will be omitted.

Referring to FIGS. 6A and 6B, according to various embodiments, the back surface plate 380 of the electronic device 101 may include a first glass plate 610 and a second glass part 620 or 630. The first glass plate 610 may include a first surface 611 and a second surface 612. For example, the first surface 611 of the first glass plate 610 may mean a surface facing a first direction, and the second surface 612 of the first glass plate 610 may mean a surface facing a second direction substantially opposite to the first direction. According to an embodiment, referring to FIG. 6A and FIG. 6B, the second glass part 620 or 630 may be disposed on the first surface 611 of the first glass plate 610. According to another embodiment, although not illustrated, the second glass part 620 or 630 may be disposed on the second surface 612 of the first glass plate 610.

Referring to FIG. 6, according to various embodiments, the color of the first glass plate 610 and the color of the second glass part 620 or 630 may be different from each other, and the colors will be described later.

Referring to FIG. 6A, according to various embodiments, the first glass plate 610 may include, on the first surface 611, a pattern area 613 including a pattern having a predetermined shape. According to an embodiment, the pattern area 613 of the first glass plate 610 may include a plurality of areas spaced apart from each other on the first surface 611. For example, in FIG. 6A, the first glass plate 610 may include a pattern area 613 including a plurality of areas having an inverted triangular shape in cross section and spaced apart from each other. According to another embodiment, although not illustrated, the pattern area 613 of the first glass plate 610 may include a single area disposed on the first surface 611. The pattern area 613 of FIG. 6A is exemplary, and the shape of the pattern included in the pattern area 613 is not limited.

Referring to FIG. 6A, according to various embodiments, the second glass part 620 may include a shape 621 corresponding to the pattern area 613 of the first glass plate 610.

For example, in FIG. 6A, the second glass part 620 may include a plurality of shapes 621 disposed to be spaced apart from each other to correspond to the pattern area 613 including a plurality of areas having an inverted triangular shape in cross section and spaced apart from each other in the first glass plate 610. As another example, although not illustrated, when the first glass plate 610 includes a pattern area including a single area, the second glass part 620 may include one shape corresponding to the pattern area.

Referring to FIG. 6A, according to various embodiments, the second glass part 620 may be disposed in an area corresponding to the pattern area 613 on the first surface 611 of the first glass plate 610, and may not be disposed in a base area 614 other than the pattern area 613 on the first surface 611. The base area 614 may mean a flat area on the first surface 611. According to an embodiment, by being disposed in an area corresponding to the pattern area 613 of the first glass plate 610, the second glass part 620 may form one flat surface with the base area 614 other than the pattern area 613 on the first surface 611 of the first glass plate 610. For example, referring to FIG. 6A, the base area 614 and the second glass part 620 of the first glass plate 610 may be exposed to the outside while forming the same plane. For example, when the back surface plate 380 illustrated in FIG. 6A is viewed from above of the first surface 611, at least a portion of the second glass part 620 may be disposed between a plurality of base areas 614 of the first glass plate 610.

Referring to FIG. 6B, according to various embodiments, the second glass part 630 may include a first area 631 corresponding to the pattern area 613 of the first glass plate 610, and a second area 632 corresponding to the base area 614 other than the pattern area 613 of the first glass plate 610. The first area 631 of the second glass part 630 may include a shape corresponding to the pattern area 613 of the first glass plate 610 (e.g., the shape 621 in FIG. 6A). The second area 632 of the second glass part 630 may form a flat portion substantially parallel to the first surface 611 of the first glass plate 610. According to an embodiment, the top surface of the first area 631 and the top surface of the second area 632 of the second glass part 630 may form a single plane. According to an embodiment, the thickness of the first area 631 and the thickness of the second area 632 of the second glass part 630 may be different from each other. For example, the thickness of the first area 631 of the second glass part 630 may be greater than the thickness of the second area 632.

The second glass part 620 of FIG. 6A may be referred to as a first-type second glass part 620. For example, as described above, the first-type second glass part 620 may be disposed only in the area corresponding to the pattern area 613 of the first glass plate 610.

The second glass part 630 of FIG. 6B may be referred to as a second-type second glass part 630. For example, as described above, the second-type second glass part 630 may be disposed in an area corresponding to the pattern area 613 of the first glass plate 610 and an area corresponding to the base area 614 of the first glass plate 610.

Figure 7:
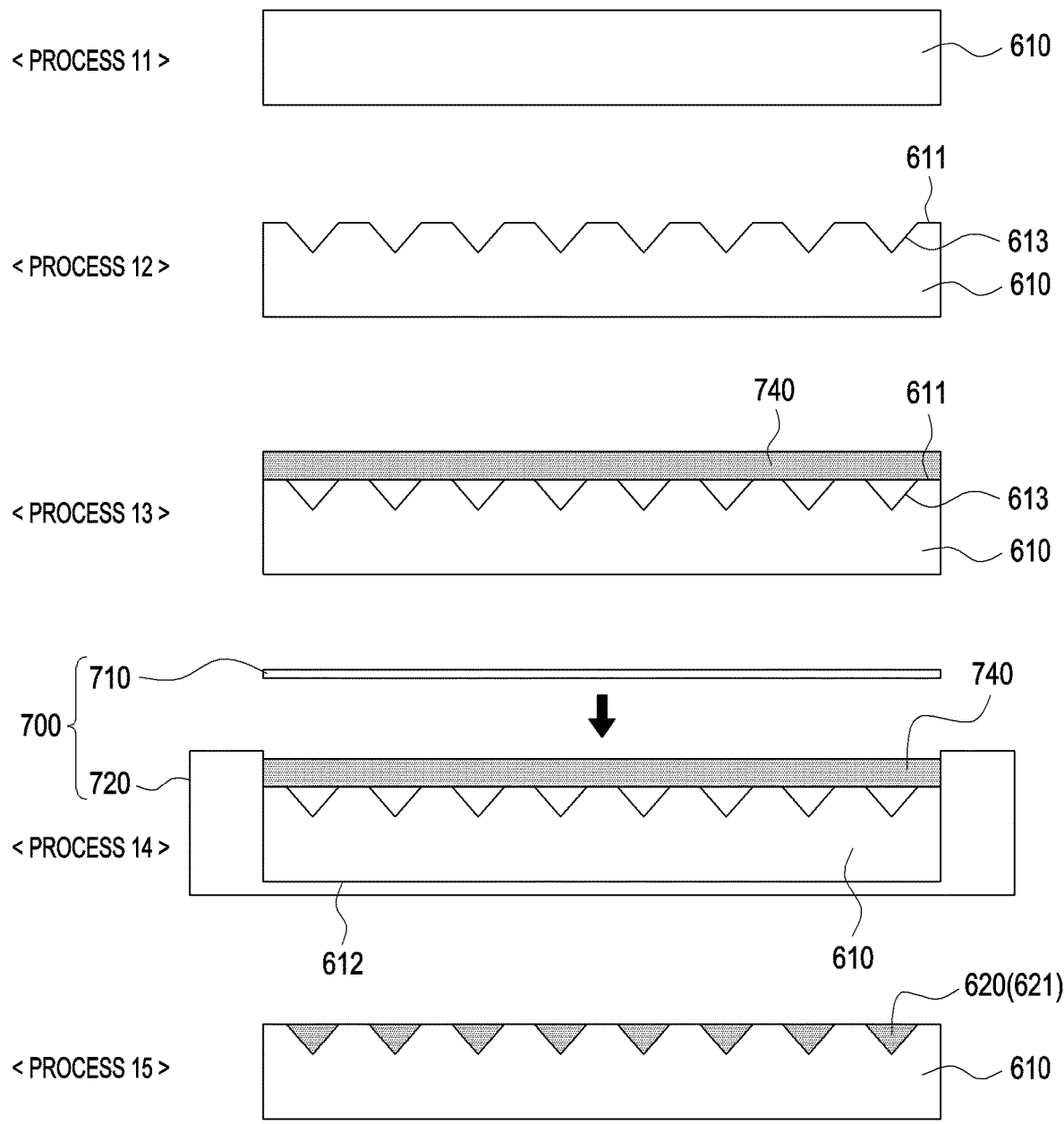
FIG. 7 is a flowchart illustrating processes of manufacturing a back surface plate of an electronic device according to an embodiment.

FIG. 7 is a flowchart illustrating processes of manufacturing a back surface plate of an electronic device according to an embodiment. FIG. 7 will be described with reference to FIG. 6.

According to various embodiments, the processes of manufacturing the back surface plate 380 may include a process of shaping a pattern on the first glass plate 610, and a process of disposing the second glass part 620 or 630 on the first glass plate 610 having the pattern shaped thereon.

According to process 11, according to various embodiments, the first glass plate 610 configured as a generally flat plate may be provided.

According to process 12, according to various embodiments, a pattern having a predetermined shape may be shaped on the first surface 611 of the first glass plate 610. According to an embodiment, through the thermal shaping process, the first glass plate 610 configured as a generally flat plate may be inserted into a mold structure to be shaped as a plate including a predetermined pattern (e.g., the pattern area 613). According to an embodiment, the entire shape of the first glass plate 610 of the back surface plate 380 may be shaped through the thermal shaping process, and a pattern may be simultaneously shaped on a portion of the back surface plate 380. Accordingly, an additional printed film lamination process is excluded, so that it is possible to save time and processing costs, and to provide a sense of beauty in design according to the thermally shaped pattern. According to another embodiment, the process of shaping the pattern on the first glass plate 610 may be a computer numerical control (CNC) (cutting and processing) process, but the pattern shaping process is not limited.

According to process 13, according to various embodiments, a second glass plate 740 configured as a generally flat plate may be seated on the first surface 611 of the first glass plate 610 including the pattern area 613.

According to an embodiment, in process 13, among a plurality of surfaces of the second glass plate 740, the surfaces to be in contact with the first surface 611 of the first glass plate 610 may be substantially flat.

According to an embodiment, the color of the second glass plate 740 may be different from the color of the first glass plate 610. For example, the second glass plate 740 may have the same raw material as the first glass plate 610, but may have a color different from that of the first glass plate 610 by including a separate additive. The additive may include cobalt, nickel and/or chromium, and the type of additive is not limited.

According to process 14, according to an embodiment, the first glass plate 610 on which the second glass plate 740 is seated may be put into the first mold structure 700. Alternatively, according to another embodiment, before the process 13, the first glass plate 610 may be put into the first mold structure 700, and thereafter, on the first surface 611 of the first glass plate 610, the second glass plate 740 may be seated. According to an embodiment, the first mold structure 700 may include a first upper core structure 710 and a first lower core structure 720. For example, putting the first glass plate 610 into the first mold structure 700 may means putting the first glass plate 610 into the inside of the first lower core structure 720. Thereafter, according to various embodiments, while the first mold structure 700 is being heated, the first upper core structure 710 of the first mold structure 700 may be lowered to be coupled with the first lower core structure 720. Alternatively, according to another embodiment, after the first mold structure 700 is heated, the first upper core structure 710 of the first mold structure 700 may be lowered to be coupled with the first lower core structure 720. There is no limitation in the order of heating and coupling (or compressing), and heating and coupling (or compressing) may be performed simultaneously or sequentially. For example, the first upper core structure 710 may be lowered and may heat the second glass plate 740 to a softening point of the second glass plate 740 or higher while compressing the second glass plate 740. For example, the first upper core structure 710 may be lowered to heat the second glass plate 740 to a melting point of the second glass plate 740 or higher while compressing the second glass plate 740. Accordingly, the second glass plate 740 disposed between the first glass plate 610 on the second lower core structure 720 and the first upper core structure 710 may be subjected to a state change according to the internal high-temperature preheating process. For example, the state of the second glass plate 740 may be changed from a fixed shape to a variable shape according to the high-temperature preheating process. For example, the second glass plate 740 may be softened. Alternatively, for example, the state of the second glass plate 740 may be changed from a solid state to a liquid state according to the high-temperature preheating process. According to various embodiments, the second glass plate 740 changed to a state having fluidity may penetrate the pattern area 613 of the first glass plate 610. In this case, the softening point of the first glass plate 610 may be higher than the softening point of the second glass plate 740. For example, in the high-temperature preheating process of process 14, the internal temperature of the first mold structure 700 may be higher than the softening point of the second glass plate 740 and lower than the softening point of the first glass plate 610. As a result, the first glass plate 610 may maintain a shape-fixed state (e.g., a solid state).

Thereafter, according to various embodiments, according to process 15, through a cooling process, the state of the second glass plate 740, which has penetrated into the pattern area 613 of the first glass plate 610, may be changed from a shape-variable state (e.g., a liquid state) to a shape-fixed state (e.g., a solid state). As a result, the second glass part 620 or 630 may be formed on the first glass plate 610.

According to an embodiment, in process 13, the volume of the second glass plate 740 seated on the first glass plate 610 may be determined based on the volume of the pattern area 613 of the first glass plate 610. As a result, the second glass plate 740 may be deformed into the first-type second glass part 620 or the second-type second glass part 630 illustrated in FIGS. 6A and 6B through processes 14 and 15. For example, in process 13, when the volume of the second glass plate 740 seated on the first glass plate 610 is a first volume, through processes 14 and 15, the second glass part 620 may be formed only in an area corresponding to the pattern area 613 of the first glass plate 610, whereby the first-type second glass part 620 may be formed. As another example, in process 13, when the volume of the second glass plate 740 seated on the first glass plate 610 is a second volume larger than the first volume, through processes 14 and 15, the second glass part 630 may also be formed in the area corresponding to the pattern area 613 of the first glass plate 610 and the area corresponding to the base area 614 of the first glass plate 610, whereby the second-type second glass part 630 may be formed. As still another example, in process 13, when the volume of the second glass plate 740 seated on the first glass plate 610 is a third volume larger than the second volume, through processes 14 and 15 to be described later, the second glass part 630 may be formed in the area corresponding to the pattern area 613 of the first glass plate 610 and the area corresponding to the base area 614 of the first glass plate 610, whereby the second-type second glass part 630, which is thicker than that in the case in which the volume of the second glass plate 740 is the second volume, may be formed.

Figure 8A:
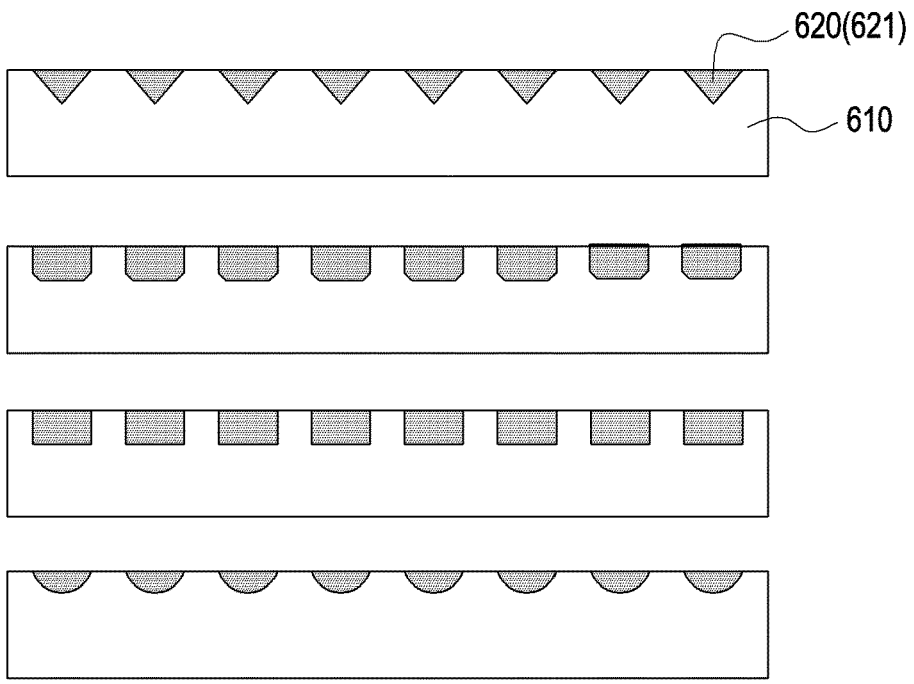
FIGS. 8A and 8B are views for describing a back surface plate of an electronic device according to various embodiments.
Figure 8B:
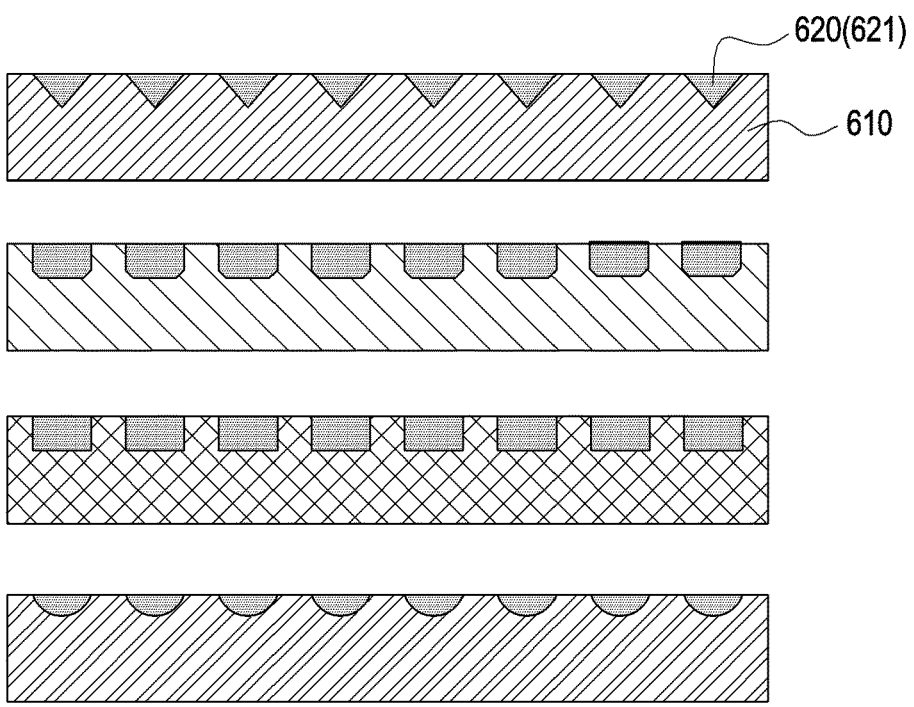

FIGS. 8A and 8B are views for describing a back surface plate of an electronic device according to various embodiments. FIGS. 8A and 8B will be described with reference to FIGS. 6A and 6B.

FIGS. 8A and 8B are views showing various shapes and colors of the back surface plate 380 including the first glass plate 610 and the second glass part 620 or 630 illustrated in FIGS. 6A and 6B. Although the first-type second glass part 620 is illustrated in FIGS. 8A and 8B, the description made with reference to FIGS. 8A and 8B may also be applicable to the second-type second glass part 630.

Referring to FIG. 8A, the shape of the pattern area 613 of the first glass plate 610 is not limited. For example, the pattern area 613 may include a pattern having an inverted triangle, a rounded quadrangle, a quadrangle, or a semicircle in cross section. Accordingly, the second glass part 620 or 630 may include a shape 621 corresponding to the pattern area 613.

According to various embodiments, the color of the second glass part 620 or 630 may be different from that of the first glass plate 610. For example, in FIG. 8A, the first glass plate 610 may be made of a transparent material.

Referring to FIG. 8B, as in FIG. 8A, the shape of the pattern area 613 is not limited. In FIG. 8B, the first glass plate 610 may also have a color, and the color of the first glass plate 610 is not limited. Even in this case, the color of the second glass part 620 or 630 may be different from that of the first glass plate 610.

Figure 9A:
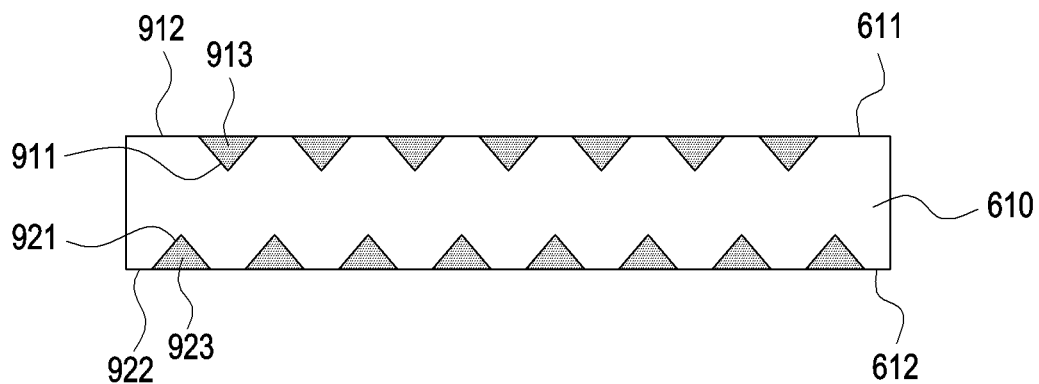
FIGS. 9A and 9B are enlarged cross-sectional views of the area S of FIG. 5, according to various embodiments.
Figure 9B:
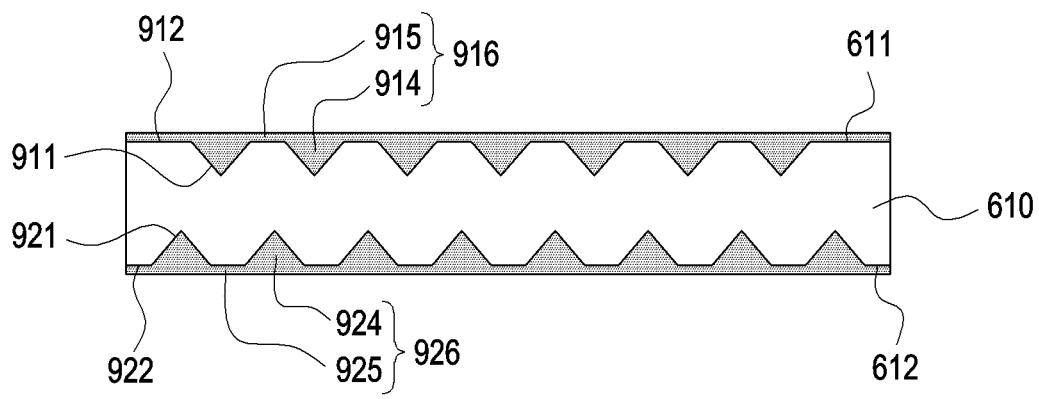
Figure 10A:
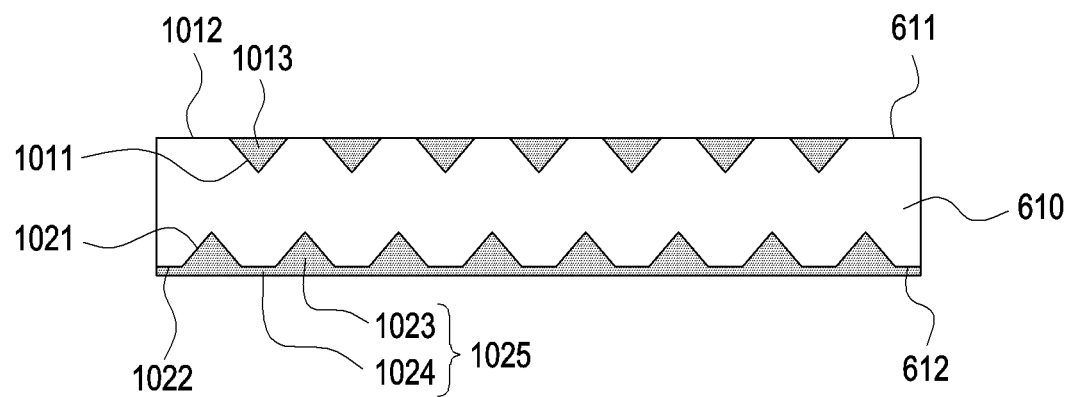
FIGS. 10A and 10B are enlarged cross-sectional views of the area S of FIG. 5, according to various embodiments.
Figure 10B:
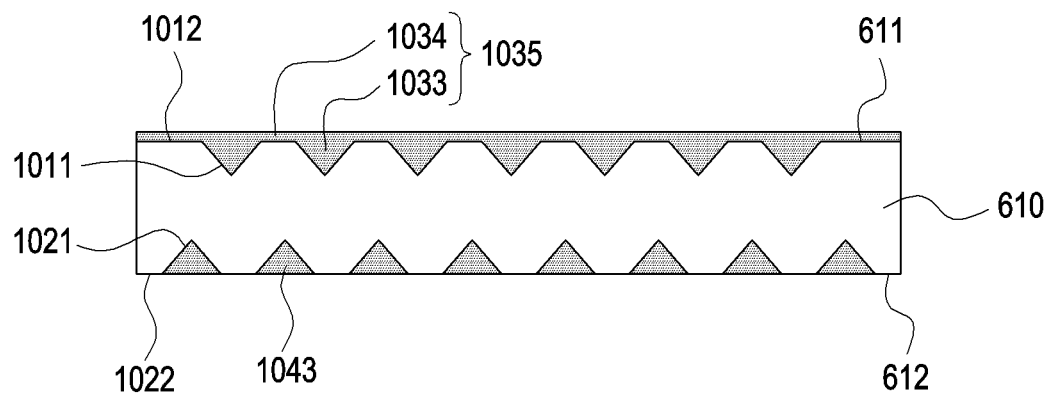

FIGS. 9A and 9B are enlarged cross-sectional views of the area S of FIG. 5, according to various embodiments. FIGS. 10A and 10B are enlarged cross-sectional views of the area S of FIG. 5, according to various embodiments. FIGS. 9A and 9B and FIGS. 10A and 10B will be described with reference to FIGS. 6A and 6B.

The description of the first-type second glass part 620 and/or the second-type second glass part 630 illustrated in FIGS. 6A and 6B may be applicable to the description made with reference to FIGS. 9A and 9B and FIGS. 10A and 10B. FIGS. 9A and 9B are views for describing an embodiment in which glass parts of the same type are disposed on respective surfaces. FIGS. 10A and 10B are views for describing an embodiment in which glass parts of different types are disposed on respective surfaces.

Referring to FIG. 9A, according to various embodiments, a back surface plate 380 may include a first glass plate 610, a first-type second glass part 913, and a first-type third glass part 923. For example, the first-type second glass part 913 may be disposed on the first surface 611 of the first glass plate 610 including the first pattern area 911, and the first-type third glass part 923 may be disposed on the second surface 612 of the first glass plate 610 including the second pattern area 921. The first-type second glass part 913 may be disposed in an area corresponding to the first pattern area 911 of the first glass plate 610, and the first-type third glass part 923 may be disposed in an area corresponding to the second pattern area 921 of the first glass plate 610. According to an embodiment, in FIG. 9A, the first glass plate 610 may be made of a transparent material or a material having a color. According to an embodiment, in FIG. 9A, the color of the second glass part 913 may be different from the color of the first glass plate 610. According to an embodiment, in FIG. 9A, the color of the third glass part 923 may be different from the color of the first glass plate 610. According to an embodiment, in FIG. 9A, the color of the third glass part 923 may be different from or the same as the color of the second glass part 913.

Referring to FIG. 9B, according to various embodiments, a back surface plate 380 may include a first glass plate 610, a second-type second glass part 916, and a second-type third glass part 926. For example, the second-type second glass part 916 may be disposed on the first surface 611 of the first glass plate 610 including the first pattern area 911, and the second-type third glass part 926 may be disposed on the second surface 612 of the first glass plate 610 including the second pattern area 921. The second-type second glass part 916 may include a first area 914 corresponding to the first pattern area 911 of the first glass plate 610, and a second area 915 corresponding to the base area 912 other than the first pattern area 911 of the first glass plate 610. The second-type third glass part 926 may include a third area 924 corresponding to the second pattern area 921 of the first glass plate 610, and a fourth area 925 corresponding to the base area 922 other than the second pattern area 921 of the first glass plate 610. According to an embodiment, in FIG. 9B, the first glass plate 610 may be made of a transparent material or a material having a color. According to an embodiment, in FIG. 9B, the color of the second glass part 916 may be different from the color of the first glass plate 610. According to an embodiment, in FIG. 9B, the color of the third glass part 926 may be different from the color of the first glass plate 610. According to an embodiment, in FIG. 9B, the color of the third glass part 926 may be different from or the same as the color of the second glass part 916.

Referring to FIG. 10A, according to various embodiments, a back surface plate 380 may include a first glass plate 610, a first-type second glass part 1013, and a second-type third glass part 1025. For example, the first-type second glass part 1013 may be disposed on the first surface 611 of the first glass plate 610 including the first pattern area 1011, and the second-type third glass part 1025 may be disposed on the second surface 612 of the first glass plate 610 including the second pattern area 1021. The first-type second glass part 1013 may be disposed in an area corresponding to the first pattern area 1011 of the first glass plate 610. The second-type third glass part 1025 may include a first area 1023 corresponding to the second pattern area 1021 of the first glass plate 610, and a second area 1024 corresponding to the base area 1022 other than the second pattern area 1021 of the first glass plate 610. According to an embodiment, in FIG. 10A, the first glass plate 610 may be made of a transparent material or a material having a color. According to an embodiment, in FIG. 10A, the color of the second glass part 1013 may be different from the color of the first glass plate 610. According to an embodiment, in FIG. 10A, the color of the third glass part 1025 may be different from the color of the first glass plate 610. According to an embodiment, in FIG. 10A, the color of the third glass part 1025 may be different from or the same as the color of the second glass part 1013.

Referring to FIG. 10B, according to various embodiments, a back surface plate 380 may include a first glass plate 610, a second-type second glass part 1035, and a first-type third glass part 1043. For example, the second-type second glass part 1035 may be disposed on the first surface 611 of the first glass plate 610 including the first pattern area 1011, and the first-type third glass part 1043 may be disposed on the second surface 612 of the first glass plate 610 including the second pattern area 1021. The second-type second glass part 1035 may include a third area 1033 corresponding to the first pattern area 1011 of the first glass plate 610, and a fourth area 1034 corresponding to the base area 1012 other than the first pattern area 1011 of the first glass plate 610. The first-type third glass part 1043 may be disposed in an area corresponding to the second pattern area 1021 of the first glass plate 610. According to an embodiment, in FIG. 10B, the first glass plate 610 may be made of a transparent material or a material having a color. According to an embodiment, in FIG. 10B, the color of the second glass part 1035 may be different from the color of the first glass plate 610. According to an embodiment, in FIG. 10B, the color of the third glass part 1043 may be different from the color of the first glass plate 610. According to an embodiment, in FIG. 10B, the color of the third glass part 1043 may be different from or the same as the color of the second glass part 1035.

In FIGS. 9A and 9B and FIGS. 10A and 10B, the pattern shape of the first pattern area 911 or 1011 included in the first surface 611 of the first glass plate 610 and the pattern shape of the second pattern area 921 or 1021 included in the second surface 612 of the first glass plate 610 are illustrated as being the same as (or similar to) each other, it will be understood by a person ordinarily skilled in the art that this is for convenience of description. For example, although not illustrated, the pattern shape of the first pattern area 911 or 1011 and the pattern shape of the second pattern area 921 or 1021 may be different from each other, and the shapes of the patterns are not limited. Alternatively, as another example, although not illustrated, the pattern shape of the first pattern area 911 or 1011 and the pattern shape of the second pattern area 921 or 1021 may be similar to (or the same as) each other, but the sizes (e.g., the horizontal widths and/or areas) of respective patterns may be different from each other, or intervals between a plurality of patterns may be different from each other. Accordingly, the shapes of the patterns and the intervals between the patterns illustrated in FIGS. 9A and 9B and FIGS. 10A and 10B are exemplary, and there is no limitation thereto.

Figure 11A:
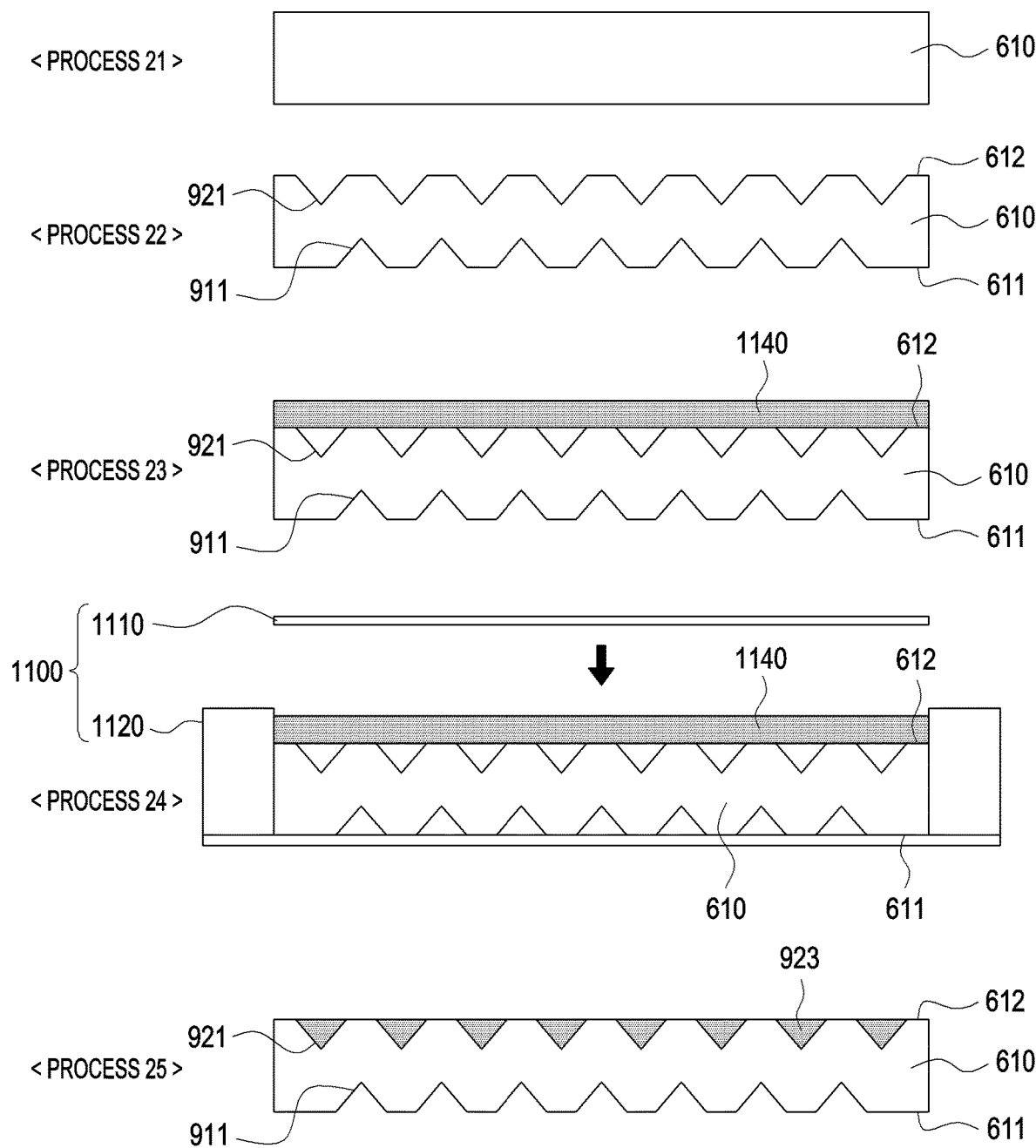
FIG. 11A is a flowchart illustrating processes of manufacturing a back surface plate of an electronic device according to an embodiment.
Figure 11B:
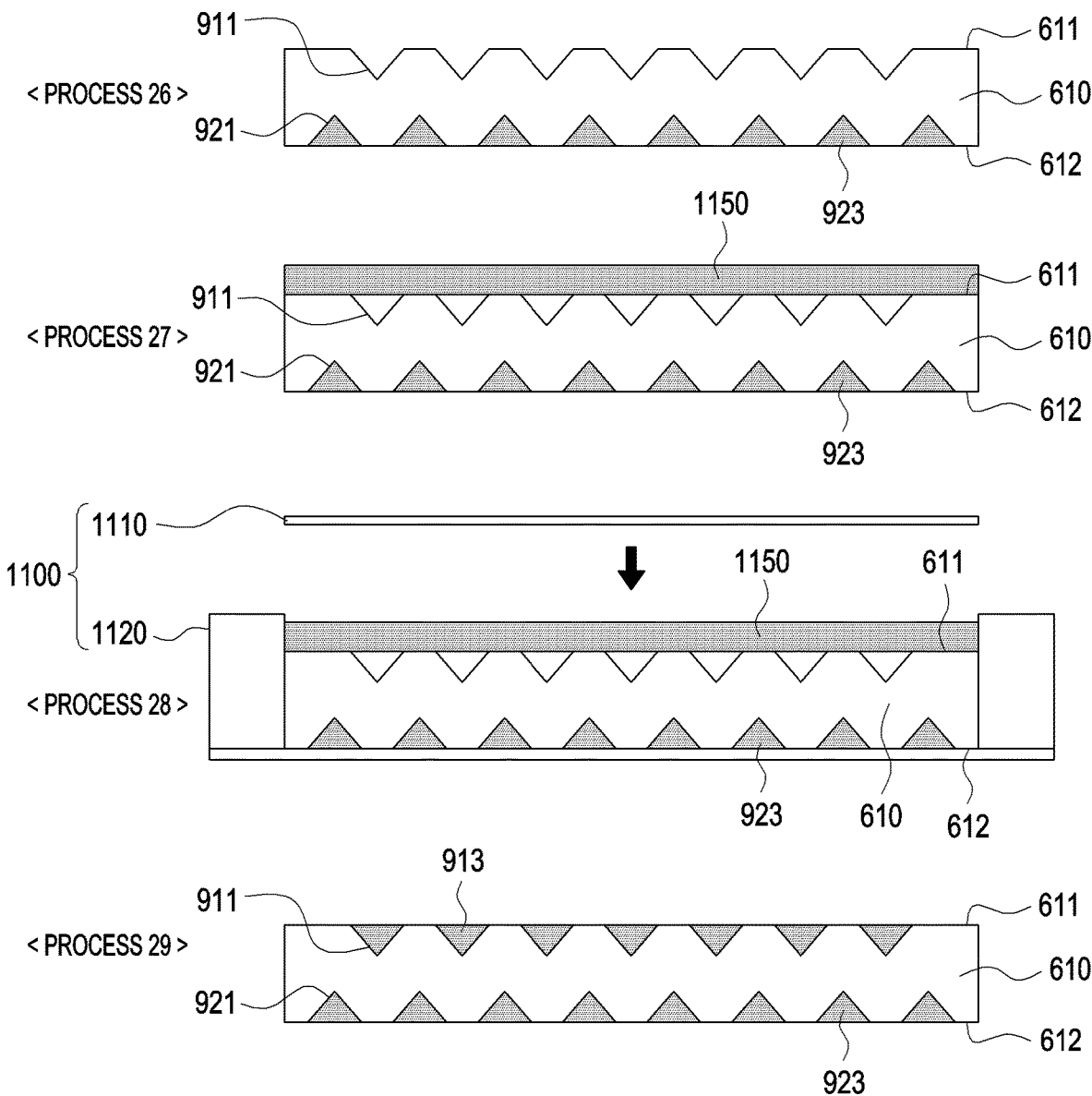
FIG. 11B is a flowchart illustrating processes of manufacturing a back surface plate of an electronic device according to an embodiment.

FIGS. 11A and 11B are flowcharts illustrating processes of manufacturing a back surface plate of an electronic device according to an embodiment. FIGS. 11A and 11B will be described with reference to FIGS. 9A and 9B.

According to various embodiments, processes of manufacturing a back surface plate 380 may include a process of shaping a pattern on the first glass plate 610, a process of disposing a second glass part (e.g., 913 in FIG. 9A) on a first surface 611 of the first glass plate 610 on which the pattern is shaped, and a process of disposing a third glass part (e.g., 923 in FIG. 9A) on a second surface 612 of the first glass plate 610 on which the pattern is shaped.

According to an embodiment, in the processes of manufacturing the back surface plate 380, the order of executing the process of disposing the second glass part (e.g., 913 in FIG. 9A) on the first surface 611 of the first glass plate 610 and the process of disposing the third glass part (e.g., 923 in FIG. 9A) on the second surface 612 of the first glass plate 610 may be determined based on relative heights of a second softening point corresponding to the second glass part (e.g., 913 in FIG. 9A) and a third softening point corresponding to the third glass part (e.g., 923 in FIG. 9A). For example, a glass part having a high softening point may be disposed first. For example, when the second softening point of the second glass part (e.g., 913 in FIG. 9A) is higher than the third softening point of the third glass part (e.g., 923 in FIG. 9A), the process of disposing the second glass part (e.g., 913 in FIG. 9A) on the first surface 611 of the first glass plate 610 may be executed first.

With reference to FIGS. 11A and 11B, an embodiment in which, based on the fact that the second softening point corresponding to the second glass part (e.g., 913 in FIG. 9A) is lower than the third softening point corresponding to the third glass part (e.g., 923 in FIG. 9A), the process of disposing the third glass part (e.g., 923 in FIG. 9A) on the second surface 612 of the first glass plate 610 is executed first will be described.

FIGS. 11A and 11B are views for describing the process of forming the shape of FIG. 9A as an example, but a person ordinarily skilled in the art may understand that the description is applicable to the descriptions made with reference to FIGS. 9B, 10A, and 10B.

According to process 21, according to various embodiments, the first glass plate 610 configured as a generally flat plate may be provided.

According to process 22, according to various embodiments, a pattern having a predetermined shape may be shaped on the first surface 611 and the second surface 612 of the first glass plate 610. According to an embodiment, in the thermal shaping process, the first glass plate 610 configured as a generally flat plate may be inserted into a mold structure to be shaped as a plate including a predetermined pattern, but there is no limitation to the pattern shaping method. There is no limitation in the order of a first process of shaping a first pattern area 911 including a pattern having a predetermined shape on the first surface 611 of the first glass plate 610 and a second process of shaping the second pattern area 921 including a pattern having a predetermined shape on the second surface 612 of the first glass plate 610, and the first process and the second process may be sequentially performed or may be performed simultaneously. The pattern of the first pattern area 911 and the pattern of the second pattern area 921 may be the same (or similar) or different, and there is no limitation in the shapes of the patterns.

According to process 23, according to various embodiments, a third glass plate 1140 configured as a generally flat plate may be seated on the second surface 612 of the first glass plate 610 including the second pattern area 921.

According to an embodiment, in process 23, among a plurality of surfaces of the third glass plate 1140, the surfaces to be in contact with the second surface 612 of the first glass plate 610 may be substantially flat.

According to an embodiment, the color of the third glass plate 1140 may be different from the color of the first glass plate 610. For example, the third glass plate 1140 may have the same raw material as the first glass plate 610, but may have a color different from that of the first glass plate 610 by including a separate additive.

According to process 24, according to an embodiment, the first glass plate 610 on which the third glass plate 1140 is seated may be put into the first mold structure 1100 (e.g., the first mold structure 700 in FIG. 7). Alternatively, according to another embodiment, before the process 23, the first glass plate 610 may be put into the first mold structure 1100, and thereafter, on the second surface 612 of the first glass plate 610, the third glass plate 1140 may be seated. According to an embodiment, the first mold structure 1100 may include a first upper core structure 1110 and a first lower core structure 1120. For example, putting the first glass plate 610 into the first mold structure 1100 may means putting the first glass plate 610 into the inside of the first lower core structure 1120. Thereafter, according to various embodiments, while the first mold structure 1100 is being heated, the first upper core structure 1110 of the first mold structure 1100 may be lowered to be coupled with the first lower core structure 1120. For example, the first upper core structure 1110 maybe lowered to heat the third glass plate 1140 to a softening point of the third glass plate 1140 or higher while compressing the third glass plate 1140. Accordingly, the third glass plate 1140 disposed between the first glass plate 610 on the second lower core structure 1120 and the first upper core structure 1110 may be subjected to a state change according to the internal high-temperature preheating process. For example, the state of the third glass plate 1140 may be changed from a shape-fixed state (e.g., a solid state) to a shape-variable state (e.g., a liquid state) according to a high-temperature preheating process. For example, the third glass plate 1140 may be melted. As a result, the third glass plate 1140 changed to a state having fluidity may penetrate the second pattern area 921 of the first glass plate 610. In this case, the softening point of the first glass plate 610 may be higher than the softening point of the third glass plate 1140. For example, in the high-temperature preheating process of process 24, the internal temperature of the first mold structure 1100 may be higher than the softening point of the third glass plate 1140 and lower than the softening point of the first glass plate 610. As a result, in process 24, the first glass plate 610 may maintain the shape-fixed shape (e.g., a solid state).

Thereafter, according to various embodiments, according to process 25, through a cooling process, the state of the third glass plate 1140, which has penetrated into the second pattern area 921 of the first glass plate 610, may be changed from a shape-variable state (e.g., a liquid state) to a shape-fixed state (e.g., a solid state). As a result, the third glass part 923 may be formed on the first glass plate 610.

According to an embodiment, in process 23, the volume of the third glass plate 1140 seated on the first glass plate 610 may be determined based on the volume of the second pattern area 921 of the first glass plate 610, and as a result, the type of the third glass part 923 may be determined. In process 25 of FIG. 11A, the first-type third glass part 923 is illustrated, but as described above, the type of the third glass part 923 may be determined based on the volume of the third glass plate 1140 in process 23.

Referring to FIG. 11B, in process 26, the first glass plate 610 on which the third glass part 923 is disposed may be turned upside down.

According to process 27, according to various embodiments, a second glass plate 1150 configured as a generally flat plate may be seated on the first surface 611 of the first glass plate 610 including the first pattern area 911.

According to an embodiment, in process 27, among a plurality of surfaces of the second glass plate 1150, the surfaces to be in contact with the first surface 611 of the first glass plate 610 may be substantially flat.

According to an embodiment, the color of the second glass plate 1150 may be different from the color of the first glass plate 610. For example, the second glass plate 1150 may have the same raw material as the first glass plate 610, but may have a color different from that of the first glass plate 610 by including a separate additive. According to an embodiment, the color of the second glass plate 1150 may be different from or equal to the color of the third glass plate 1140. For example, when the color of the second glass plate 1150 is different from that of the third glass plate 1140, the second glass plate 1150 may have the same raw material as the first glass plate 610, but may have a color that is different from that of the third glass plate 1140 by including an additive that is different from that of the third glass plate 1140. As another example, when the color of the second glass plate 1150 is the same as that of the third glass plate 1140, the second glass plate 1150 may have the same raw material as the first glass plate 610, but by including an additive that is different from that of the third glass plate 1140, the second glass plate 1150 may have a softening point different from that of the third glass plate 1140 and a color equal to that of the third glass plate 1140.

According to process 28, according to an embodiment, the first glass plate 610 on which the second glass plate 1150 is seated may be put into the first mold structure 1100. Alternatively, according to another embodiment, before the process 27, the first glass plate 610 may be put into the first mold structure 1100, and thereafter, on the first surface 611 of the first glass plate 610, the second glass plate 1150 may be seated. Thereafter, according to various embodiments, while the first mold structure 1100 is being heated, the first upper core structure 1110 of the first mold structure 1100 may be lowered to be coupled with the first lower core structure 1120. For example, the first upper core structure 1110 may be lowered and may heat the second glass plate 1150 to a softening point of the second glass plate 1150 or higher while compressing the second glass plate 740. Accordingly, the second glass plate 1150 disposed between the first glass plate 610 on the second lower core structure 1120 and the first upper core structure 1110 may be subjected to a state change according to the internal high-temperature preheating process. For example, the state of the second glass plate 1150 may be changed from a shape-fixed state (e.g., a solid state) to a shape-variable state (e.g., a liquid state) according to a high-temperature preheating process. For example, the second glass plate 1150 may be melted. As a result, the second glass plate 1150 changed to a state having fluidity may penetrate the first pattern area 911 of the first glass plate 610. In this case, the softening point of the second glass plate 1150 may be lower than the softening point of the first glass plate 610 and the softening point of the third glass plate 1140. For example, in the high-temperature preheating process of process 28, the internal temperature of the first mold structure 1100 may be higher than the softening point of the second glass plate 1150, lower than the softening point of the first glass plate 610, and lower than the softening point of the third glass plate 1140 (or the third glass part 923). As a result, in process 28, the first glass plate 610 and the third glass part 923 may maintain the shape-fixed shape (e.g., a solid state).

Thereafter, according to various embodiments, according to process 29, through a cooling process, the state of the second glass plate 1150, which has penetrated into the first pattern area 911 of the first glass plate 610, may be changed from a shape-variable state (e.g., a liquid state) to a shape-fixed state (e.g., a solid state). As a result, the second glass part 913 may be formed on the first glass plate 610.

According to an embodiment, in process 27, the volume of the second glass plate 1150 seated on the first glass plate 610 may be determined based on the volume of the first pattern area 911 of the first glass plate 610, and as a result, the type of the second glass part 913 may be determined. In process 29 of FIG. 11A, the first-type second glass part 913 is illustrated, but as described above, the type of the second glass part 913 may be determined based on the volume of the second glass plate 1150 in process 27.

Figure 12:
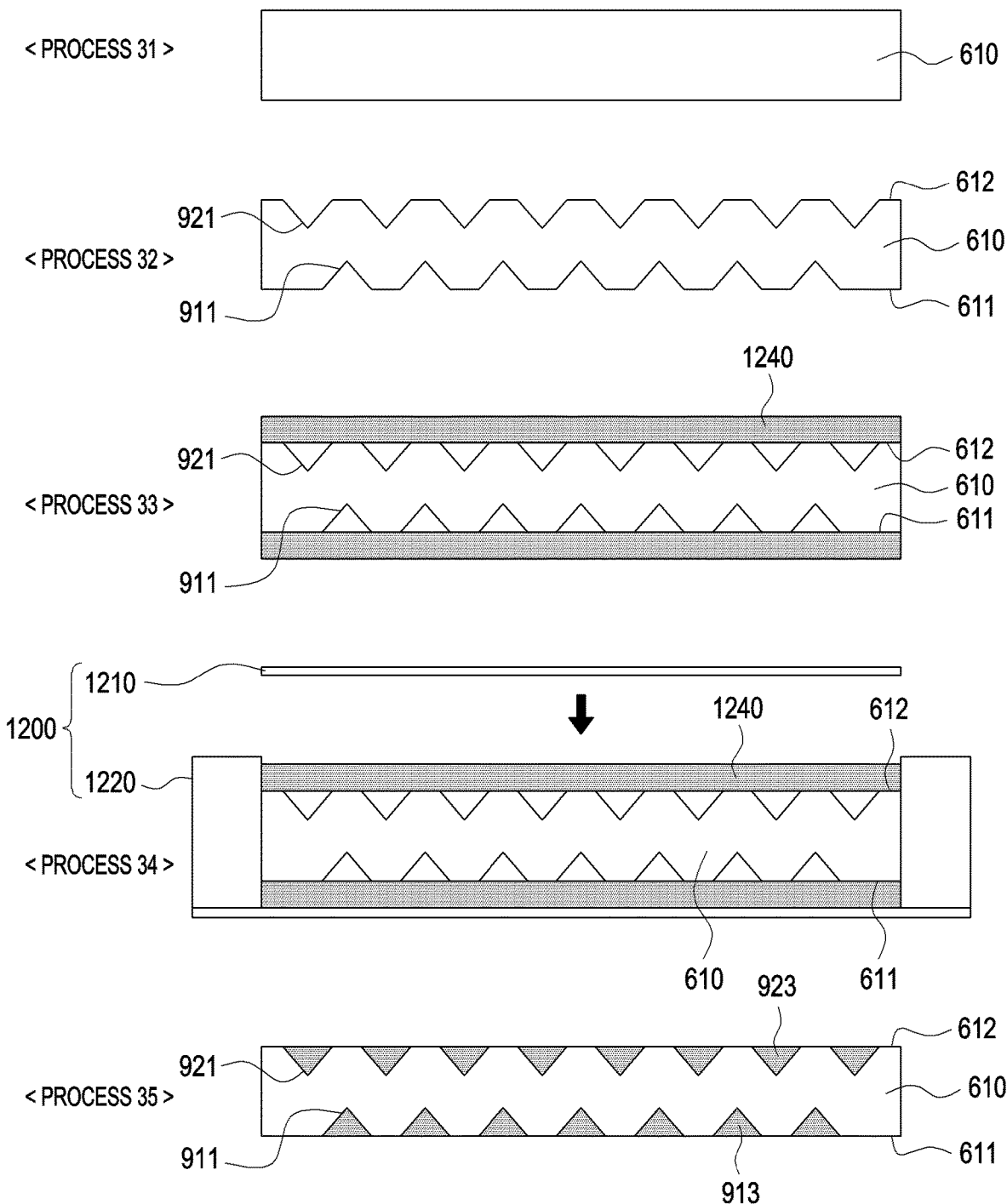
FIG. 12 is a flowchart illustrating processes of manufacturing a back surface plate of an electronic device according to an embodiment.

FIG. 12 is a flowchart illustrating processes of manufacturing a back surface plate of an electronic device according to an embodiment. FIG. 12 will be described with reference to FIGS. 9A and 9B.

According to various embodiments, processes of manufacturing a back surface plate 380 may include a process of shaping a pattern on the first glass plate 610, a process of disposing a second glass part (e.g., 913 in FIG. 9A) on a first surface 611 of the first glass plate 610 on which the pattern is shaped, and a process of disposing a third glass part (e.g., 923 in FIG. 9A) on a second surface 612 of the first glass plate 610 on which the pattern is shaped.

With reference to FIG. 12, an embodiment in which the process of disposing the second glass part (e.g., 913 in FIG. 9A) on the first surface 611 of the first glass plate 610 and the process of disposing the third glass part (e.g., 923 in FIG. 9A) on the second surface 612 of the first glass plate 610 are executed simultaneously will be described.

FIG. 12 is a view for describing the process of forming the shape of FIG. 9A as an example, but a person ordinarily skilled in the art may understand that the description is applicable to the descriptions made with reference to FIGS. 9B, 10A, and 10B.

According to process 31, according to various embodiments, the first glass plate 610 configured as a generally flat plate may be provided.

According to process 32, according to various embodiments, a pattern having a predetermined shape may be shaped on the first surface 611 and the second surface 612 of the first glass plate 610. Process 32 may be understood with reference to process 22.

According to process 33, according to various embodiments, a third glass plate 1240 configured as a generally flat plate may be seated on the second surface 612 of the first glass plate 610 including the second pattern area 921, and a second glass plate 1250 configured as a gradually flat plate may be seated under the first surface 611 of the first glass plate 610 including the first pattern area 911. In FIG. 12, the second surface 612 on which the third glass plate 1240 is seated faces upward, and the first surface 611 on which the second glass plate 1250 is seated faces downward. However, this is an example, and the upside-down state of the drawing illustrated in process 33 is also possible.

According to an embodiment, in process 33, among the plurality of surfaces of the third glass plate 1240, a surface to be in contact with the second surface 612 of the first glass plate 610 may be substantially flat, and among the plurality of surfaces of the second glass plate 1250, a surface to be in contact with the first surface 611 of the first glass plate 610 may be substantially flat.

According to an embodiment, the color of the third glass plate 1240 may be different from the color of the first glass plate 610. For example, the third glass plate 1240 may have the same raw material as the first glass plate 610, but may have a color different from that of the first glass plate 610 by including a separate additive.

According to an embodiment, the color of the second glass plate 1250 may be different from the color of the first glass plate 610. For example, the second glass plate 1250 may have the same raw material as the first glass plate 610, but may have a color different from that of the first glass plate 610 by including a separate additive.

According to an embodiment, the color of the third glass plate 1240 and the color of the second glass plate 1250 may be different or may be the same based on the types of additives included in the third glass plate 1240 and the second glass plate 1250.

According to process 34, according to an embodiment, the first glass plate 610 on which the third glass plate 1240 and the second glass plate 1250 are seated may be put into the second mold structure 1200. Alternatively, according to another embodiment, before process 33, the second glass plate 1250 may be put into a second mold structure 1200, the first glass plate 610 may be seated on the second glass plate 1250, and the third glass plate 1240 may be seated on the first glass plate 610. According to an embodiment, the second mold structure 1200 may include a second upper core structure 1210 and a second lower core structure 1220. For example, putting the first glass plate 610 into the second mold structure 1200 may mean putting the first glass plate 610 into the second lower core structure 1220. Thereafter, according to various embodiments, while the second mold structure 1200 is being heated, the second upper core structure 1210 of the second mold structure 1200 may be lowered to be coupled with the second lower core structure 1220. For example, the second upper core structure 1210 may be lowered and may heat the third glass plate 1240 to the softening point of the third glass plate 1240 or higher and the second glass plate 1250 to the softening point of the second glass plate 1250 or higher while compressing the third glass plate 1240 and compressing the second glass plate 1250 via the second lower core structure 1220. As a result, the second glass plate 1250 disposed between the second lower core structure 1220 and the first glass plate 610 and the third glass plate 1240 disposed between the first glass plate 610 and the second upper core structure 1210 may be subjected to a state change according to the internal high-temperature preheating process. For example, the state of the third glass plate 1240 and the state of the second glass plate 1250 may be changed from a shape-fixed state (e.g., a solid state) to a shape-variable state (e.g., a liquid state) according to a high-temperature preheating process. For example, the third glass plate 1240 and the second glass plate 1250 may be melted. Accordingly, the third glass plate 1240 changed to a state having fluidity may penetrate the second pattern area 921 of the first glass plate 610, and the second glass plate 1250 changed to a state having fluidity may penetrate the first pattern area 911 of the first glass plate 610. In this case, the softening point of the first glass plate 610 may be higher than the softening point of the third glass plate 1240 and the softening point of the second glass plate 1250. For example, in the high-temperature preheating process of process 34, the internal temperature of the second mold structure 1200 may be higher than the softening point of the third glass plate 1240 and the softening point of the second glass plate 1250 and lower than the softening point of the first glass plate 610. As a result, in process 34, the first glass plate 610 may maintain the shape-fixed shape (e.g., a solid state).

Thereafter, according to various embodiments, according to process 35, through the cooling process, the state of the third glass plate 1240, which has penetrated into the second pattern area 921 of the first glass plate 610, may be changed from the shape-variable state (e.g., a liquid state) to a shape-fixed state (e.g., a solid state), and the state of the second glass plate 1250, which has penetrated into the first pattern area 911 of the first glass plate 610, may be changed from the shape-variable state (e.g., a liquid state) to the shape-fixed state (e.g., a solid state). Accordingly, the third glass part 923 may be formed on the second surface 612 of the first glass plate 610, and the second glass part 913 may be formed on the first surface 611 of the first glass plate 610.

According to an embodiment, in process 33, the volume of the third glass plate 1240 and the volume of the second glass plate 1250 seated on the first glass plate 610 may be determined based on the volume of the second pattern area 921 and the volume of the first pattern area 911 of the first glass plate 610, respectively. As a result, the type of the third glass part 923 and the type of the second glass part 913 may be determined. In step 35 of FIG. 12, the first-type third glass part 923 and the first-type second glass part 913 are illustrated, but as described above, the type of the third glass part 923 and the type of the second glass part 913 may be determined based on the volume of the third glass plate 1240 and the volume of the second glass plate 1250 in process 33.

Figure 13A:
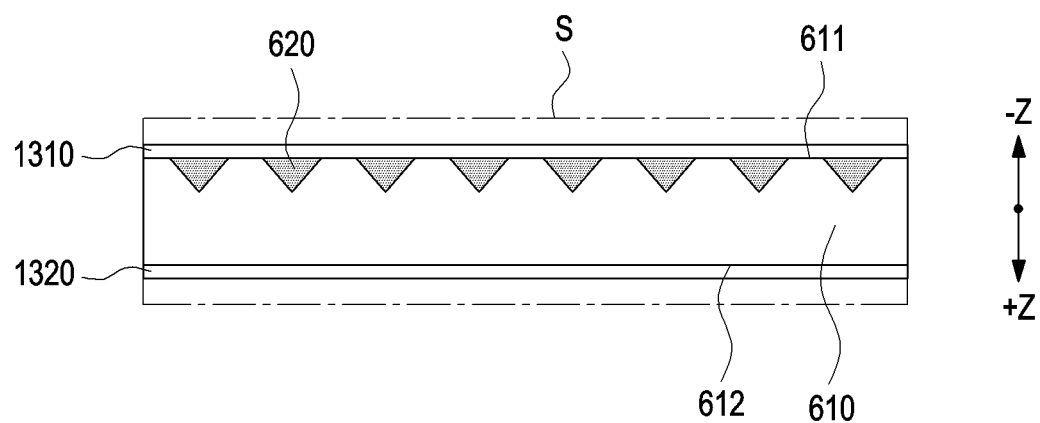
FIGS. 13A and 13B are enlarged cross-sectional views of the area S of FIG. 5, according to an embodiment.
Figure 13B:
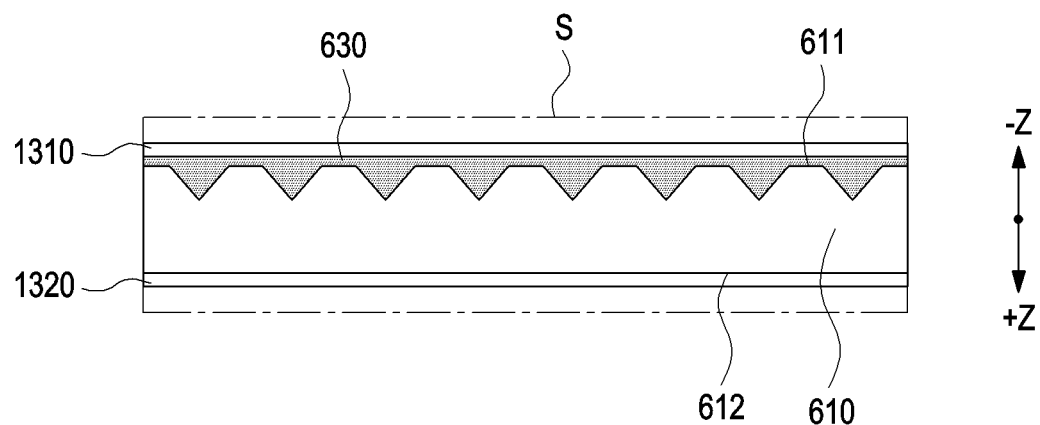

FIGS. 13A and 13B are enlarged cross-sectional views of the area S of FIG. 5, according to an embodiment.

Referring to FIGS. 13A and 13B, according to various embodiments, a plurality of layers may be disposed in a back surface plate 380 by being stacked.

FIG. 13A is a view illustrating a back surface plate 380 including the first glass plate 610 illustrated in FIG. 6A and the first-type second glass part 620 disposed on the first surface 611 of the first glass plate 610.

FIG. 13B is a view illustrating a back surface plate 380 including the first glass plate 610 illustrated in FIG. 6B and the second-type second glass part 630 disposed on the first surface 611 of the first glass plate 610.

In FIGS. 13A and 13B, the second surface 612 of the first glass plate 610 may face a first direction (+Z), and the first surface 611 may face a second direction (−Z) opposite to the first direction (+Z).

According to an embodiment, referring to FIGS. 13A and 13B, the back surface plate 380 may include a shield layer 1320 and/or a coating layer 1310.

According to an embodiment, referring to FIGS. 13A and 13B and the drawings to be described later (e.g., FIGS. 14A and 14B, FIGS. 15A and 15B, and FIGS. 16A and 16B), when a back surface plate 380 includes a shield layer 1320 and/or a coating layer 1310, the back surface plate 380 may not include a separate film layer. Alternatively, according to another embodiment, the back surface plate 380 may include a separate film layer (not illustrated) (e.g., an anti-shattering film layer).

According to various embodiments, referring to FIGS. 13A and 13B, the shield layer 1320 may be disposed in the first direction (+Z) of the first glass plate 610. The shield layer 1320 may include at least one layer. When the shield layer 1320 includes a plurality of layers, respective layers may be made of different materials. The shield layer 1320 may block a path of light directed to the outside or the inside of the electronic device 101. For example, the shield layer 1320 may prevent light leakage of the electronic device 101 or block light provided to the electronic device 101 from the outside. According to an embodiment, the shield layer 1320 may be formed of a material using black ink, and may be manufactured through a light-blocking printing process.

According to various embodiments, the coating layer 1310 may be stacked in the second direction (−Z) of the first glass plate 610. For example, referring to FIG. 13A, the coating layer 1310 may be formed by performing a coating process on the entire plane formed by the second glass part 620 and the first surface 611 of the first glass plate 610. As another example, referring to FIG. 13B, the coating layer 1310 may be formed by performing a coating process on the entire plane facing the second (−Z) direction in the second glass part 630. The coating layer 1310 may have a thickness smaller than the thickness of the first glass plate 610 and may be disposed to enclose the outer surface of the electronic device 101 to prevent foreign substances from penetrating into or contaminating the inside of the electronic device.

Figure 14A:
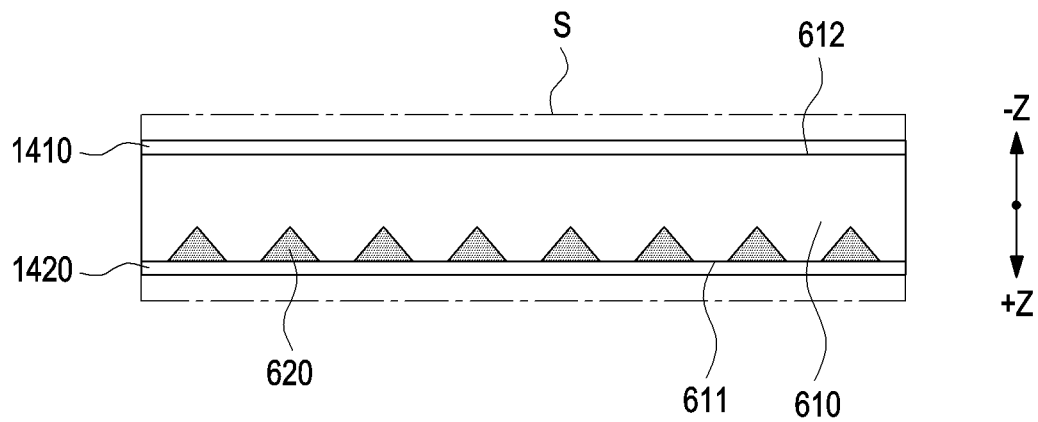
FIGS. 14A and 14B are enlarged cross-sectional views of the area S of FIG. 5, according to an embodiment.
Figure 14B:
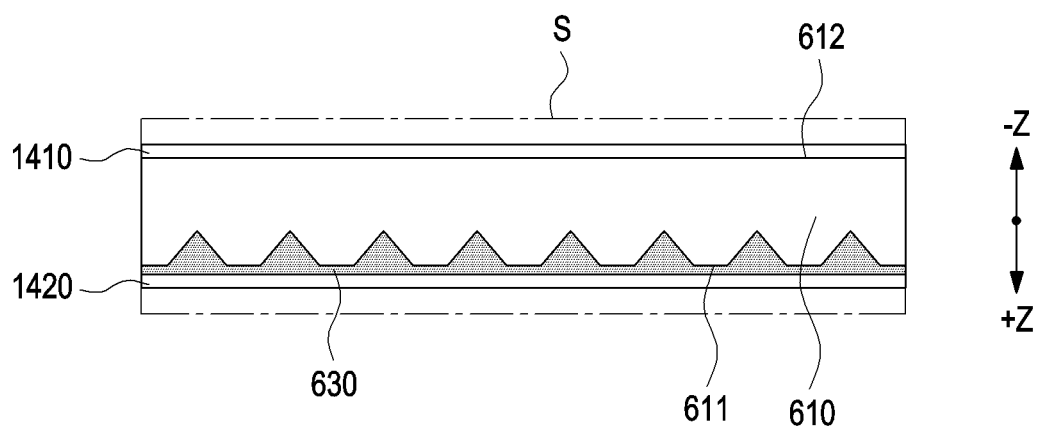

FIGS. 14A and 14B are enlarged cross-sectional views of the area S of FIG. 5, according to an embodiment.

Referring to FIGS. 14A and 14B, according to various embodiments, a plurality of layers may be disposed in a back surface plate 380 by being stacked.

FIG. 14A illustrates the back surface plate 380 of FIG. 6A in the upside-down state.

FIG. 14B illustrates the back surface plate 380 of FIG. 6B in the upside-down state.

In FIGS. 14A and 14B, the first surface 611 of the first glass plate 610 may face a first direction (+Z), and the second surface 612 may face a second direction (−Z) opposite to the first direction (+Z).

According to an embodiment, referring to FIGS. 14A and 14B, the back surface plate 380 may include a shield layer 1420 and/or a coating layer 1410.

According to various embodiments, the shield layer 1420 may be disposed in the first direction (+Z) of the first glass plate 610. For example, referring to FIG. 14A, the shield layer 1420 may be disposed on the plane formed by the second glass part 620 and the first surface 611 of the first glass plate 610. As another example, referring to FIG. 14B, the shield layer 1420 may be disposed on a plane facing the first direction (+Z) in the second glass part 630. The shield layer 1420 of FIGS. 14A and 14B may be understood as being similar to the shield layer 1320 of FIGS. 13A and 13B.

According to various embodiments, referring to FIGS. 14A and 14B, the coating layer 1410 may be disposed in the second direction (−Z) of the first glass plate 610. The coating layer 1410 of FIGS. 14A and 14B may be understood as being similar to the coating layer 1310 of FIGS. 13A and 13B.

Figure 15A:
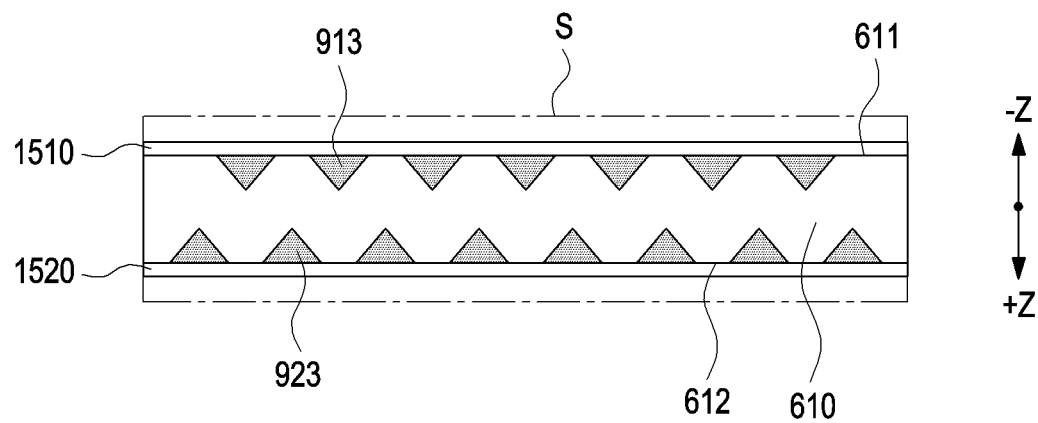
FIGS. 15A and 15B are enlarged cross-sectional views of the area S of FIG. 5, according to an embodiment.
Figure 15B:
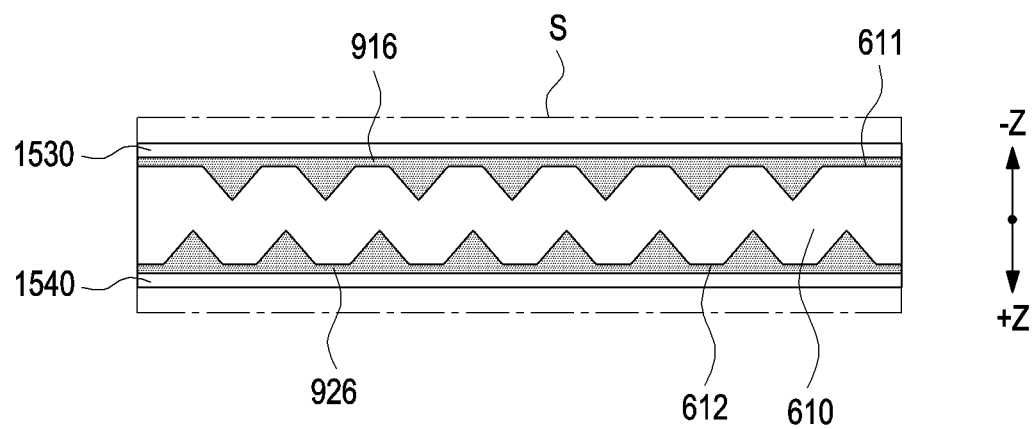

FIGS. 15A and 15B are enlarged cross-sectional views of the area S of FIG. 5, according to an embodiment.

Referring to FIGS. 15A and 15B, according to various embodiments, a plurality of layers may be disposed in a back surface plate 380 by being stacked.

FIG. 15A illustrates a back surface plate 380 including the first glass plate illustrated in FIG. 9A, a first-type second glass part 913 disposed on the first surface 611 of the first glass plate 610, and a first-type third glass part 923 disposed on the second surface 612 of the first glass plate 610.

FIG. 15B illustrates a back surface plate 380 including the first glass plate illustrated in FIG. 9B, a second-type second glass part 916 disposed on the first surface 611 of the first glass plate 610, and a second-type third glass part 926 disposed on the second surface 612 of the first glass plate 610.

In FIGS. 15A and 15B, the second surface 612 of the first glass plate 610 may face a first direction (+Z), and the first surface 611 may face a second direction (−Z) opposite to the first direction (+Z).

According to an embodiment, referring to FIG. 15A, the back surface plate 380 may include a shield layer 1520 and/or a coating layer 1510. In FIG. 15A, the shield layer 1520 may be disposed in the first direction (+Z) of the first glass plate 610. For example, the shield layer 1520 may be disposed on a plane formed by the third glass part 923 and the second surface 612 of the first glass plate 610. The shield layer 1520 of FIG. 15A may be understood as being similar to the shield layer 1320 of FIGS. 13A and 13B. In FIG. 15A, the coating layer 1510 may be disposed in the second direction (−Z) of the first glass plate 610. For example, the coating layer 1510 may be disposed on a plane formed by the second glass part 913 and the first surface 611 of the first glass plate 610. The coating layer 1510 of FIG. 15A may be understood as being similar to the coating layer 1310 of FIGS. 13A and 13B.

According to an embodiment, referring to FIG. 15B, the back surface plate 380 may include a shield layer 1540 and/or a coating layer 1530. In FIG. 15B, the shield layer 1540 may be disposed on a plane facing the first direction (+Z) in the third glass part 926. The shield layer 1540 of FIG. 15B may be understood as being similar to the shield layer 1320 of FIGS. 13A and 13B. In FIG. 15B, the coating layer 1530 may be disposed on a plane facing the second direction (−Z) in the second glass part 916. The coating layer 1530 of FIG. 15B may be understood as being similar to the coating layer 1310 of FIGS. 13A and 13B.

Figure 16A:
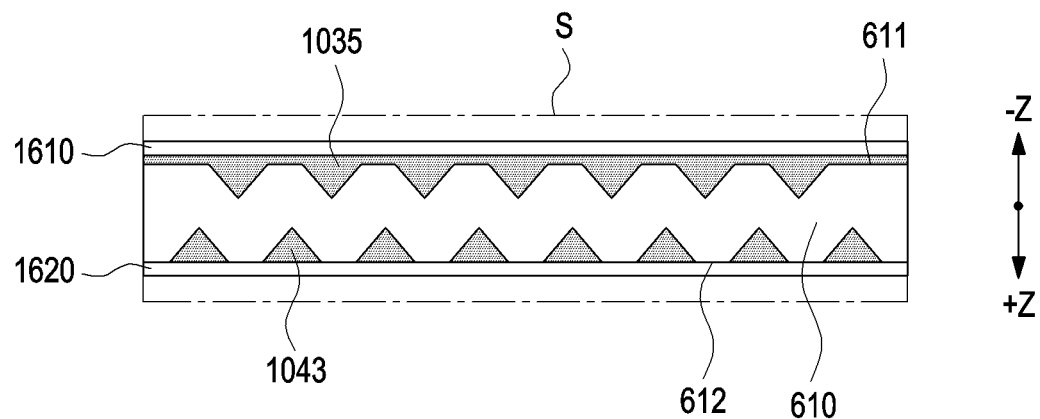
FIGS. 16A and 16B are enlarged cross-sectional views of the area S of FIG. 5, according to an embodiment.
Figure 16B:
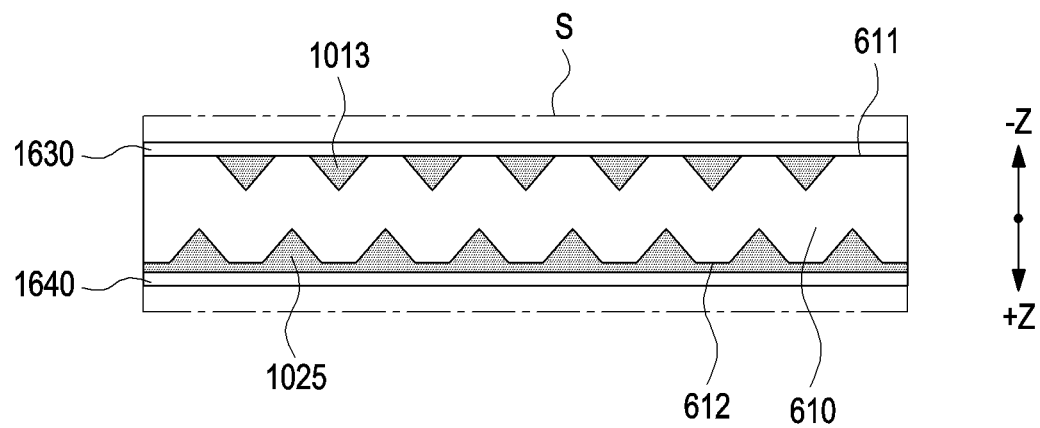

FIGS. 16A and 16B are enlarged cross-sectional views of the area S of FIG. 5, according to an embodiment.

Referring to FIGS. 16A and 16B, according to various embodiments, a plurality of layers may be disposed in a back surface plate 380 by being stacked.

FIG. 16A illustrates a back surface plate 380 including the first glass plate illustrated in FIG. 10B, a second-type second glass part 1035 disposed on the first surface 611 of the first glass plate 610, and a first-type third glass part 1043 disposed on the second surface 612 of the first glass plate 610.

FIG. 16B illustrates a back surface plate 380 including the first glass plate illustrated in FIG. 10A, a first-type second glass part 1013 disposed on the first surface 611 of the first glass plate 610, and a second-type third glass part 1025 disposed on the second surface 612 of the first glass plate 610.

In FIGS. 16A and 16B, the second surface 612 of the first glass plate 610 may face a first direction (+Z), and the first surface 611 may face a second direction (−Z) opposite to the first direction (+Z).

According to an embodiment, referring to FIG. 16A, the back surface plate 380 may include a shield layer 1620 and/or a coating layer 1610. In FIG. 16A, the shield layer 1620 may be disposed in the first direction (+Z) of the first glass plate 610. For example, the shield layer 1620 may be disposed on a plane formed by the third glass part 1043 and the second surface 612 of the first glass plate 610. The shield layer 1620 of FIG. 16A may be understood as being similar to the shield layer 1320 of FIGS. 13A and 13B. In FIG. 16A, the coating layer 1610 may be disposed on a plane facing the second direction (−Z) in the second glass part 1035. The coating layer 1610 of FIG. 16A may be understood as being similar to the coating layer 1310 of FIGS. 13A and 13B.

According to an embodiment, referring to FIG. 16B, the back surface plate 380 may include a shield layer 1640 and/or a coating layer 1630. In FIG. 16B, the shield layer 1640 may be disposed on a plane facing the first direction (+Z) in the third glass part 1025. The shield layer 1640 of FIG. 16B may be understood as being similar to the shield layer 1320 of FIGS. 13A and 13B. In FIG. 16B, the coating layer 1630 may be disposed on a plane formed by the second glass part 1013 and the first surface 611 of the first glass plate 610. The coating layer 1630 of FIG. 16B may be understood as being similar to the coating layer 1310 of FIGS. 13A and 13B.

A person ordinarily skilled in the art may understand that the various embodiments described herein may be organically applied to each other within an applicable range.

According to various embodiments, a back surface plate configured to form a back surface of an electronic device may include: a first glass plate (e.g., 610) including a first pattern area (e.g., 613) including a pattern having a predetermined shape on a first surface (e.g., 611); and a second glass part (e.g., 620 or 630) at least a portion of which is disposed on the first surface of the first glass plate, the second glass part including a first shape (e.g., 621 or 631) corresponding to the first pattern area, wherein the second glass part may have a color different from that of the first glass plate.

According to various embodiments, the second glass part may be disposed in an area corresponding to the first pattern area on the first surface, and may not be disposed in a base area (e.g., 614) other than the first pattern area on the first surface.

According to various embodiments, the first pattern area may include a plurality of areas (e.g., 613) disposed on the first surface to be spaced apart from each other, and the first shape of the second glass part may include a plurality of shapes (e.g., 621 or 631) corresponding to the plurality of areas.

According to various embodiments, the second glass part may be disposed in the area corresponding to the first pattern area to form one plane with the base area on the first surface of the first glass plate.

According to various embodiments, the second glass part may include a first area (e.g., 631) disposed in an area corresponding to the first pattern area on the first surface, and a second area (e.g., 632) disposed in a base area (e.g., 614) other than the first pattern area on the first surface.

According to various embodiments, a first thickness of the first area may be greater than a second thickness of the second area.

According to various embodiments, the back surface plate may further include: a shield layer (e.g., 1320, 1420, 1520, 1540, 1620, or 1640) disposed on a second surface (e.g., 612) opposite to the first surface of the first glass plate; and a coating layer (e.g., 1310, 1410, 1510, 1530, 1610, or 1630) disposed on the third surface of the second glass part, wherein the first surface and the third surface may face the same direction.

According to various embodiments, the first glass plate may further include a second pattern area (e.g., 921) provided on a second surface (e.g., 612) opposite to the first surface, the back surface plate may further include a third glass part (e.g., 923, 926, 1025, or 1043) disposed on the second surface of the first glass plate and including a second shape (e.g., 923, 924, 1023, or 1043) corresponding to the second pattern area, and the third glass part may have a color different from that of the first glass plate.

According to various embodiments, the third glass part may have a color different from that of the second glass part.

According to various embodiments, the softening point of the second glass part may be lower than the softening point of the first glass plate.

According to various embodiments, a method of manufacturing a back surface plate 380 may include: a process of shaping a first glass plate (e.g., 610) including a first pattern area (e.g., 613) including a pattern of a predetermined shape on a first surface (e.g., 611) (e.g., process 12); a process of seating a second glass part (e.g., 740) having a color different from a color of the first glass plate on the first surface including the first pattern area (e.g., process 13); a process of putting the first glass plate on which the second glass part is seated into a mold structure (e.g., 700) to be seated in an area of a lower core structure (e.g., 720) of the mold structure such that a second surface (e.g., 612) opposite to the first surface faces the lower core structure of the mold structure (e.g., process 14); a process of preheating the second glass part at a high temperature, and lowering an upper core structure (e.g., 710) of the mold structure toward the lower core structure (e.g., process 14); a process of causing the second glass part to penetrate into the first pattern area by pressing the second glass part by the upper core structure (e.g., process 14); and a process of cooling (e.g., process 15).

According to various embodiments, in the process of seating the second glass part on the first surface of the first glass plate, a surface that is in contact with the first surface among a plurality of surfaces of the second glass part may be substantially flat.

According to various embodiments, the softening point of the second glass part may be lower than the softening point of the first glass plate.

According to various embodiments, in the process of causing the second glass part to penetrate into the first pattern area, the second glass part may be penetrated into the first pattern area after the state of the material of the second glass part is changed to a fluid state.

According to various embodiments, in the process of seating the second glass part on the first surface of the first glass plate, the volume of the second glass part may be determined based on the volume of the first pattern area.

According to various embodiments, after the cooling, the method may further include: a process of disposing a shield layer (e.g., 1320, 1420, 1520, 1540, 1620, or 1640) on the second surface of the first glass plate; and a process of disposing a coating layer (e.g., 1310, 1410, 1510, 1530, 1610, or 1630) on a third surface of the second glass part, wherein the third surface may face the same direction as the first surface of the first glass plate.

According to various embodiments, the process of shaping the first glass plate including the first pattern area (e.g., process 22) may further include shaping a second pattern area (e.g., 911) on the second surface of the first glass plate (e.g., process 22).

According to various embodiments, after the process of cooling (e.g., process 25), the method may further include: a process of seating a third glass part (e.g., 1150) having a color different from a color of the first glass plate on the second surface of the first glass plate on which the second glass part is disposed on the first surface (e.g., process 27); a process of putting the first glass plate on which the third glass part is seated into the mold structure such that the first surface on which the second glass part is disposed is seated to face the lower core structure (e.g., process 28); a process of preheating the third glass part at a high temperature, and lowering the upper core structure of the mold structure toward the lower core structure (e.g., process 28); and a process of causing the third glass part to penetrate into the second pattern area by pressing the third glass part by the upper core structure (e.g., process 28).

According to various embodiments, the softening point of the second glass part may be lower than the softening point of the first glass plate and higher than a softening point of the third glass part.

According to various embodiments, an electronic device 101 may include: a housing 310 including a front surface plate 320 facing a first direction and a back surface plate 380 facing a second direction opposite to the front surface plate, wherein at least a portion of the front surface plate includes a transparent area; a battery 350 disposed inside the housing; and a display 330 disposed in the housing and including a screen area exposed through the front surface plate, wherein the back surface plate may include: a first glass plate 610 including a first pattern area including a pattern having a predetermined shape on a first surface facing the second direction; and a second glass part (e.g., 620 or 630) disposed on the first glass plate in the second direction, and including a first shape corresponding to the first pattern area, wherein the second glass part may have a color different from that of the first glass plate.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., via a wired connection), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A back surface plate configured to form a back surface of an electronic device, the back surface plate comprising:
    a first glass part including a first pattern area including a pattern having a predetermined shape on a first surface; and
    a second glass part at least portion of which is disposed on the first surface of the first glass part, the second glass part including a first shape complimentary to the first pattern area,
    wherein the second glass part has a color different from a color of the first glass part,
    wherein a softening point of the second glass part is lower than a softening point of the first glass part.

2. The back surface plate of claim 1, wherein the second glass part is disposed in an area corresponding to the first pattern area on the first surface, and is not disposed in a base area other than the first pattern area on the first surface.

3. The back surface plate of claim 2, wherein the first pattern area includes a plurality of areas disposed on the first surface to be spaced apart from each other, and
    the first shape of the second glass part includes a plurality of shapes corresponding to the plurality of areas.

4. The back surface plate of claim 2, wherein the second glass part is disposed in the area corresponding to the first pattern area to form one plane with the base area on the first surface of the first glass part.

5. The back surface plate of claim 1, wherein the second glass part includes a first area disposed in an area corresponding to the first pattern area on the first surface, and a second area disposed in a base area other than the first pattern area on the first surface.

6. The back surface plate of claim 5, wherein a first thickness of the first area is greater than a second thickness of the second area.

7. The back surface plate of claim 1, further comprising:
    wherein the second glass part include a third surface,
    a shield layer disposed on a second surface opposite to the first surface of the first glass part; and
    a coating layer disposed on the third surface of the second glass part,
    wherein the first surface and the third surface are oriented in a same direction.

8. The back surface plate of claim 1, wherein the first glass part further includes a second pattern area provided on a second surface opposite to the first surface, the back surface plate further includes a third glass part disposed on the second surface of the first glass part and including a second shape corresponding to the second pattern area, and the third glass part has a color different from a color of the first glass part.

9. The back surface plate of claim 8, wherein the third glass part has a color different from a color of the second glass part.

10. A method of manufacturing a back surface plate, the method comprising:

shaping a first glass part including a first pattern area including a pattern of a predetermined shape on a first surface, the first glass part having a first color;

seating a second glass part on the first surface of the a first glass part, the second glass part having a second color, the second color being different from the first color;

placing the first glass part with the second glass part being seated on the first surface of the first glass part, into an area of a lower core structure of a mold structure such that the second surface opposite to the first surface of the first glass part faces the lower core structure of the mold structure;

preheating the second glass part at a high temperature, and lowering an upper core structure of the mold structure toward the lower core structure;

causing the second glass part to be penetrated into the first pattern area by pressing the second glass part by the upper core structure; and hardening the second glass part, which is preheated and then caused to penetrate into the first pattern, by lowering the high temperature.

11. The method of claim 10, wherein in the seating the second glass part on the first surface of the first glass part, a surface that is in contact with the first surface among a plurality of surfaces of the second glass part is substantially flat.

12. The method of claim 10, wherein a softening point of the second glass part is lower than a softening point of the first glass part.

13. The method of claim 12, wherein, in the causing the second glass part to be penetrated into the first pattern area, the second glass part is penetrated into the first pattern area after a state of a material of the second glass part is changed to a fluid state.

14. The method of claim 10, wherein, in the seating the second glass part on the first surface of the first glass part, a volume of the second glass part is determined based on a volume of the first pattern area.

15. The method of claim 10, wherein, after the hardening, the method further comprises:

disposing a shield layer on the second surface of the first glass part; and disposing a coating layer on a third surface of the second glass part, wherein the third surface faces a same direction as the first surface of the first glass part.

16. The method of claim 10, wherein the shaping the first glass part including the first pattern area further includes shaping a second pattern area on the second surface of the first glass part.

17. The method of claim 16, wherein, after the hardening, the method further comprises:

seating a third glass part having a color different from a color of the first glass part on the second surface of the first glass part on which the second glass part is disposed on the first surface;

putting the first glass part on which the third glass part is seated into the mold structure such that the first surface on which the second glass part is disposed is seated to face the lower core structure;

preheating the third glass part at a high temperature, and lowering the upper core structure of the mold structure toward the lower core structure; and causing the third glass part to be penetrated into the second pattern area by pressing the third glass part by the upper core structure.

18. The method of claim 17, wherein a softening point of the second glass part is lower than a softening point of the first glass part and higher than a softening point of the third glass part.

19. An electronic device comprising:

a housing including a front surface plate facing a first direction and a back surface plate facing a second direction opposite to the front surface plate, wherein at least a portion of the front surface plate includes a transparent area;

a battery disposed inside the housing; and a display disposed inside the housing and including a screen area exposed through the front surface plate, wherein the back surface plate includes:

a first glass part including a first pattern area including a pattern having a predetermined shape on a first surface; and a second glass part disposed on the first glass part in the second direction, and including a first shape complimentary to the first pattern area, wherein the second glass part has a color different from a color of the first glass part, wherein a softening point of the second glass part is lower than a softening point of the first glass part.

* * * * *